US010127771B2

(12) United States Patent
Nakamura

(10) Patent No.: US 10,127,771 B2
(45) Date of Patent: Nov. 13, 2018

(54) GAMING MACHINE AND METHODS OF PROVIDING GAMES TO PLAYERS WITH A SPECIAL SYMBOL TRIGGERING MULTIPLE FEATURE GAMES

(71) Applicant: Konami Gaming, Inc., Las Vegas, NV (US)

(72) Inventor: Daisuke Nakamura, Zama (JP)

(73) Assignee: KONAMI GAMING, INC., Las Vegas, NV (US)

( * ) Notice: Subject to any disclaimer, the term of this patent is extended or adjusted under 35 U.S.C. 154(b) by 110 days.

(21) Appl. No.: 15/181,053

(22) Filed: Jun. 13, 2016

(65) Prior Publication Data

US 2017/0092042 A1 Mar. 30, 2017

(30) Foreign Application Priority Data

Sep. 28, 2015 (AU) ................................ 2015230846

(51) Int. Cl.
*A63F 13/00* (2014.01)
*G07F 17/32* (2006.01)
*G07F 17/34* (2006.01)

(52) U.S. Cl.
CPC ............ *G07F 17/326* (2013.01); *G07F 17/32* (2013.01); *G07F 17/3213* (2013.01); *G07F 17/3225* (2013.01); *G07F 17/3244* (2013.01); *G07F 17/3258* (2013.01); *G07F 17/3267* (2013.01); *G07F 17/34* (2013.01)

(58) Field of Classification Search
None
See application file for complete search history.

(56) References Cited

U.S. PATENT DOCUMENTS

| | | | | |
|---|---|---|---|---|
| 7,780,520 B2 | 8/2010 | Baerlocher | | |
| 2005/0282620 A1* | 12/2005 | Marks | G07F 17/3265 | 463/20 |
| 2008/0146309 A1* | 6/2008 | Bennett | G07F 17/3244 | 463/18 |
| 2010/0298042 A1* | 11/2010 | Berman | G07F 17/3244 | 463/20 |
| 2011/0014965 A1* | 1/2011 | Inamura | G07F 17/3262 | 463/20 |
| 2013/0122988 A1* | 5/2013 | Guinn | G07F 17/3211 | 463/20 |
| 2016/0042614 A1* | 2/2016 | Kojima | G07F 17/34 | 463/20 |

OTHER PUBLICATIONS

Australian Patent Examination Report No. 1 for Patent Application No. 2015230846 dated Oct. 26, 2015.
Australian Patent Examination Report No. 2 for Patent Application No. 2015230846 dated Feb. 5, 2016.

* cited by examiner

*Primary Examiner* — Jason Yen
(74) *Attorney, Agent, or Firm* — Howard & Howard Attorneys PLLC

(57) ABSTRACT

A gaming machine for providing a game to a player is described herein. The gaming machine displays a primary game including a plurality of reels and spins and stops the reels to display the outcome of the primary game. The gaming machine detects a first triggering condition appearing in the outcome of the primary game and responsively initiates a bonus award game upon detecting the first triggering condition, and detects a second triggering condition appearing in the outcome of the primary game and responsively initiates a free game feature upon detecting the second triggering condition.

20 Claims, 20 Drawing Sheets

108

166

152

| No. of Spins Awarded | Award Selection Probability | | | |
|---|---|---|---|---|
| | MINI | MAJOR | MEGA | MAXI |
| 1 | 50% | 48% | 1% | 1% |
| 2 | 40% | 45% | 10% | 5% |
| 3 | 25% | 25% | 25% | 25% |
| 4 | 50% | 40% | 5% | 5% |

FIG. 18

166

152

| Bonus Award | Award Value | Award Selection Probability | | | |
|---|---|---|---|---|---|
| | | 1st Spin | 2nd Spin | 3rd Spin | 4th Spin |
| MINI | $5.01 | 85% | 75% | 50% | 20% |
| MAJOR | $10.10 | 10% | 20% | 25% | 40% |
| MEGA | $50.01 | 4% | 4% | 10% | 30% |
| MAXI | $500.09 | 1% | 1% | 5% | 10% |

FIG. 19

132

114

| No. of Trigger Symbols | Progressive Game Probability |
|---|---|
| 1 | 5% |
| 2 | 10% |
| 3 | 15% |
| 4 | 20% |
| 5 | 25% |
| 6 | 30% |
| 7 | 35% |
| 8 | 40% |
| 9 | 45% |
| 10 | 50% |
| 11 | 55% |
| 12 | 60% |
| 13 | 65% |
| 14 | 70% |
| 15 | 75% |

FIG. 20

GAMING MACHINE AND METHODS OF PROVIDING GAMES TO PLAYERS WITH A SPECIAL SYMBOL TRIGGERING MULTIPLE FEATURE GAMES

CROSS-REFERENCE TO RELATED APPLICATION

This application claims priority to Australian Patent Application No. 2015230846, filed Sep. 28, 2015, the disclosure of which is hereby incorporated by reference in its entirety.

COPYRIGHT NOTICE

The figures included herein contain material that is subject to copyright protection. The copyright owner has no objection to the facsimile reproduction by anyone of this patent document as it appears in the U.S. Patent and Trademark Office, patent file or records, but reserves all copyrights whatsoever in the subject matter presented herein.

TECHNICAL FIELD

The subject matter disclosed herein relates generally to gaming machines and more particularly, to gaming machines and method for providing a game to a player that includes a special symbol that triggers multiple feature games.

BACKGROUND OF THE INVENTION

Known gaming devices include a video display device to display a reel game that includes a plurality of reels with each reel including a plurality of symbols. During game play, the gaming device accepts a wager from a player, the player selects one or more paylines, the gaming device spins the reels, and sequentially stops each reel to display a combination of symbols on the reels. The gaming device then awards the player an award based on the combination of symbols orientated along the selected payline.

At least some known modern gaming machines frequently have feature game including bonus game, free game and/or progressive game in addition to a primary game or a base game. These gaming machines allow players to play the feature game if triggering condition is satisfied during primary game. The triggering conditions are classifiable into mystery trigger, symbol trigger, system trigger and their combination. The mystery trigger determines the satisfaction of the condition based on random number derived from RNG in the background of the primary game. The symbol trigger determines the satisfaction of the condition based on symbols included in the result of the primary game. And the system trigger determines the satisfaction of the condition based on command/signal from server system such as casino management system, player tracking system, gaming server for providing server-side gaming and the like.

To the manufacturers developing gaming machines, providing an attractive game that can actively draw in casino guests as players is a critical theme to improving functionality of gaming machines. Thus, new feature triggering system is necessary to appeal to player interest and enhance excitement in order to entice longer play and increased profitability. The present invention is directed to satisfying these needs.

SUMMARY OF THE INVENTION

In one aspect of the present invention, a gaming machine for providing a game to a player is provided. The gaming machine includes a display device and a gaming controller coupled to the display device. The gaming controller is configured to display a primary game on the display device including a plurality of reels being displayed in a grid. Each of the reels including a plurality of symbols. The gaming controller randomly generates an outcome of the primary game, spins and stops the reels to display the outcome of the primary game, and provides an award to the player as a function of the outcome of the primary game. The gaming controller detects a first triggering condition appearing in the outcome of the primary game and responsively initiates a bonus award game upon detecting the first triggering condition, and detects a second triggering condition appearing in the outcome of the primary game and responsively initiates a free game feature upon detecting the second triggering condition.

In another aspect of the present invention, a computer-implemented method of providing a game to a player via a gaming machine is provided. The gaming machine includes a display device and a gaming controller. The computer-implemented method includes displaying a primary game on the display device including a plurality of reels being displayed in a grid, randomly generating an outcome of the primary game, spinning and stopping the reels to display the outcome of the primary game, and providing an award to the player as a function of the outcome of the primary game. The method includes detecting a first triggering condition appearing in the outcome of the primary game and responsively initiating a bonus award game upon detecting the first triggering condition, and detecting a second triggering condition appearing in the outcome of the primary game and responsively initiating a free game feature upon detecting the second triggering condition.

In yet another aspect of the present invention, one or more non-transitory computer-readable storage media, having computer-executable instructions embodied thereon, is provided. The computer-executable instructions cause a processor to display a primary game on a display device including a plurality of reels and a plurality of symbols being displayed with the plurality of reels. The processor randomly generates an outcome of the primary game, spinning and stopping the reels to display the outcome of the primary game, and provides an award to the player as a function of the outcome of the primary game. The processor detects a first triggering condition appearing in the outcome of the primary game and responsively initiate a bonus award game upon detecting the first triggering condition, and detects a second triggering condition appearing in the outcome of the primary game and responsively initiate a free game feature upon detecting the second triggering condition.

BRIEF DESCRIPTION OF THE DRAWINGS

Other advantages of the present invention will be readily appreciated as the same becomes better understood by reference to the following detailed description when considered in connection with the accompanying drawings wherein:

FIGS. 18-20 are exemplary illustrations of data records that may be used by the gaming device shown in FIG. 1, according to an embodiment of the present invention.

Corresponding reference characters indicate corresponding parts throughout the drawings.

DETAILED DESCRIPTION OF THE PREFERRED EMBODIMENT

With reference to the drawings and in operation, the present invention overcomes a problems rooted in gaming machine technology and at least some of the disadvantages of known gaming systems by providing a gaming machine that uses a special symbol appearing in the outcome of a game to triggering a plurality of different feature games. The gaming machine randomly generates an outcome of a primary game, detects a first triggering condition appearing in the outcome of the primary game and responsively initiates a bonus award game upon detecting the first triggering condition, and detects a second triggering condition appearing in the outcome of the primary game and responsively initiate a free game feature upon detecting the second triggering condition. In one embodiment, the first and second triggering conditions are detected if a number of identical special trigger symbols appear in the primary game outcome, and initiates the free game feature and the bonus award game feature based on different numbers of special trigger symbols.

For example, in one embodiment, the gaming machine may evaluate the combination of special trigger symbols as follows: A) more than 3 symbols on pay line with left to right basis trigger free games; B) more than 3 symbols in the symbol array (scatter basis) provide a chance of progressive game; and C) If both of A) and B) are satisfied, a chance of progressive game is provided and free games are triggered. Accordingly, even if it is revealed that a player misses a free game trigger in the middle of the game, the player may still win a chance of progressive game as the outcome of the primary game is revealed to the player.

Hence, player can enjoy expectation for triggering any of multiple feature game with single kind of triggering symbol till the game ends. The single kind of triggering symbol makes the game rule simple and easy to understand. At the same time, multiple feature games provide multiple expectation of chance for triggering feature games through single game. In this way, the invention described herein provides multiplex expectation and excitement with simple and easy game rule.

In addition, the present invention improves the functionality of known gaming machines by increasing the probability of providing bonus features to a player without requiring additional special symbols and/or feature triggers. Thus the computer resources required to display bonus features is significantly reduced over known gaming machines.

A selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 1:
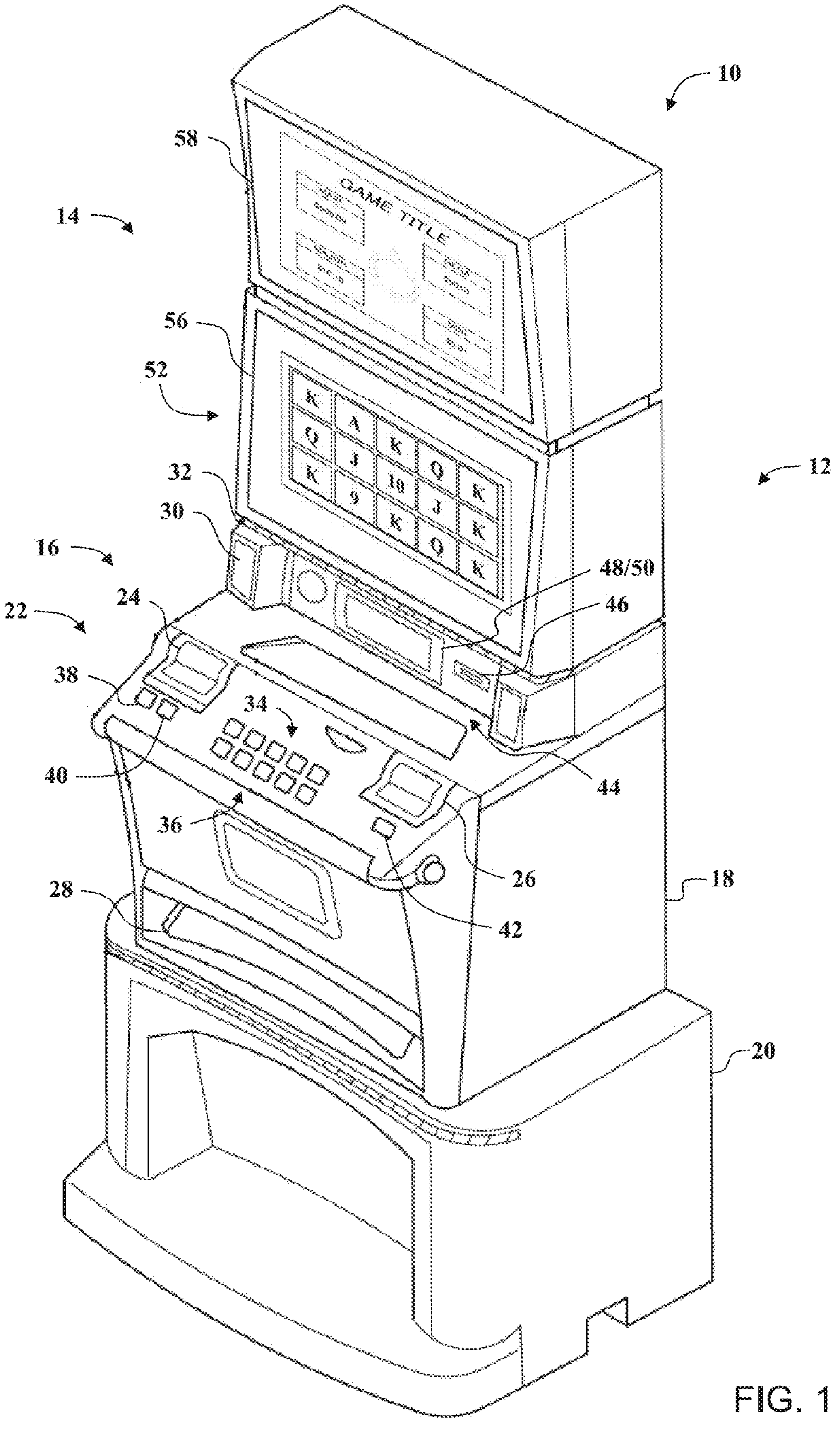
FIG. 1 is a perspective view of an exemplary gaming device for use in providing a game to a player, according to an embodiment of the present invention.
Figure 2:
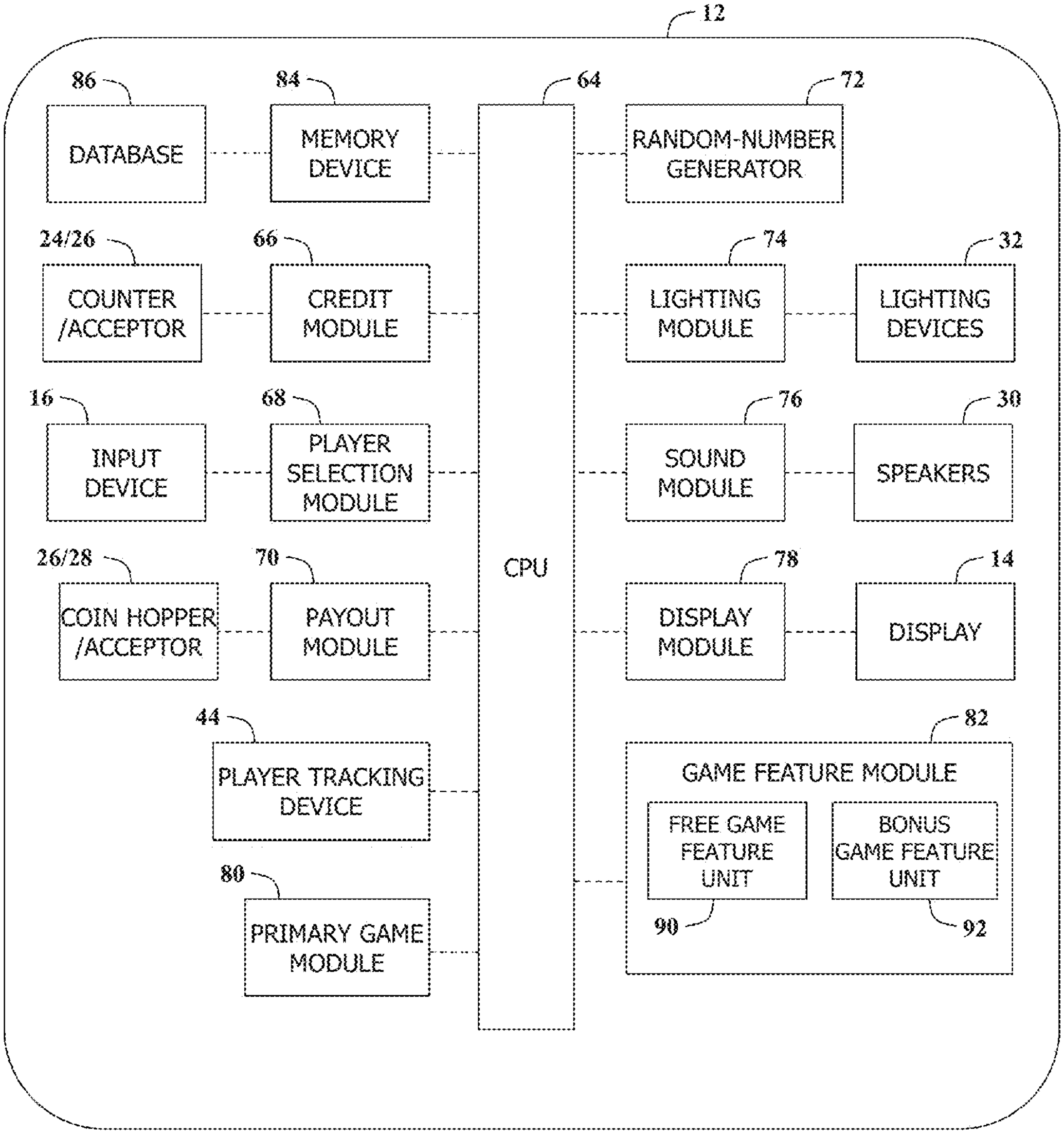
FIG. 2 is a schematic representation of a gaming controller that may be used with the gaming device shown in FIG. 1, according to an embodiment of the present invention.

FIG. 1 is a perspective view of an exemplary gaming device 10 for providing an award to a player, according to an embodiment of the present invention. FIG. 2 is a schematic representation of a gaming controller 12 that may be used with the gaming device 10. In the illustrated embodiment, the gaming device 10 includes a display device 14 for displaying a plurality of games, a user input device 16 to enable a player to interface with the gaming device 10, and a gaming controller 12 that is operatively coupled to the display device 14 and the user input device 16 to enable a player to play games being displayed on the display device 14. In one embodiment, the gaming device 10 may include a gaming machine installed in a casino. In another embodiment, the gaming device 10 may include a personal computer, laptop, cell phone, smartphone, tablet computer, personal data assistant, and/or any suitable computing device.

In the illustrated embodiment, the gaming device 10 also includes a cabinet assembly 18 that is configured to support the display device 14, the user input device 16, and/or the gaming controller 12 from a gaming stand 20 and/or a supporting surface. The display device 14 and the user input device 16 are each coupled to the cabinet assembly 18 and are each accessible by the player. In one embodiment, the gaming controller 12 is positioned within the cabinet assembly 18. Alternatively, the gaming controller 12 may be separated from the cabinet assembly 18, and connected to components of the gaming device 10 through a network such as, for example, a LAN, a WAN, dial-in-connections, cable modems, wireless modems, and/or special high-speed ISDN lines. For example, in one embodiment, the gaming controller 12 may be located remotely with respect to the gaming device 10, or within another gaming device 10.

The user input device 16 includes a plurality of input buttons 22, a coin slot 24, and/or a bill acceptor 26. The coin slot 24 includes an opening that is configured to receive coins and/or tokens deposited by the player into the gaming device 10. The gaming controller 12 converts a value of the coins and/or tokens to a corresponding amount of gaming credits that are used by the player to wager on games played on the gaming device 10. In one embodiment, the user input device 16 may include an acceptor device which accepts media associated with a monetary value to establish a credit balance, a validator device configured to identify physical media, and a cash-out button actuatable to cause an initiation of a payout associated with the credit balance. In one embodiment, the acceptor device may be configured to receive physical media such as, for example, a coin, a medal, a ticket, a card, a bill, currency, and/or any suitable physical media that enables the gaming machine 10 to function as described herein. The acceptor device may also be configured to accept virtual media such as, for example, an RFID signal, a keypad and/or touch screen entry, a personal identification number and/or identifier, a player tracking account, a virtual credit balance, reward points, gaming credits, bonus points, and/or any suitable virtual media that enables the gaming machine 10 to function as described herein. For example, in one embodiment, the coin slot may include an opening that is configured to receive coins and/or tokens deposited by the player into the gaming machine 10.

The bill acceptor 26 includes an input and output device that is configured to accept a bill, a ticket, and/or a cash card into the bill acceptor 26 to enable an amount of gaming credits associated with a monetary value of the bills, ticket, and/or cash card to be credited to the gaming device 10. Moreover, the gaming device 10 may also utilize a cashless wagering system (not shown), such as a ticket in ticket out (TITO) system (not shown). In one embodiment, the bill acceptor 26 also includes a printer (not shown) that is configured to dispense a printed voucher ticket that includes information indicative of an amount of credits and/or money paid out to the player by the gaming device 10 during a gaming session. The voucher ticket may be used at other gaming devices, or redeemed for cash, and/or other items as part of a casino cashless system (not shown). In one embodiment, the acceptor device and/or the validator device may include the coin slot 24, the bill acceptor 26, a TITO system, a cashless wagering system, and/or a player tracking device.

A coin hopper 28 is coupled to the cabinet assembly 18 and is configured to receive a plurality of coins that are dispensed from the gaming device 10. One or more speakers 30 are installed inside the cabinet assembly 18 to generate voice announcements and/or sound effects associated with game play. The gaming device 10 also includes one or more lighting devices 32 that are configured to blink and/or change brightness and color in specific patterns to produce lighting effects to enhance a visual gaming experience for the player.

In one embodiment, the input buttons 22 include a plurality of BET switches 34 for inputting a wager on a game, a plurality of selection switches 36 for selecting a betting line, a payline, and/or card, a MAXBET switch 38 for inputting a maximum wager, a PAYOUT switch 40 for ending a gaming session and dispensing accumulated gaming credits to the player, and a start switch, i.e., a SPIN/DEAL button 42 to initiate an output of a game. In the illustrated embodiment, the user input device 16 may include a plurality of physical buttons coupled to the cabinet assembly 18. In another embodiment, the user input device 16 may include a video touch display that displays video images of the input buttons 22. The user input device 16 may also include a touchless display being displayed with changeable video images of the input buttons 22.

In the illustrated embodiment, the BET switches 34 include five switches from 1BET to 5BET to enable a player to wager between a minimum bet up to 5× minimum bet. Each selection switch 36 corresponds to a betting line such as, for example, a payline and/or symbol for a reel game, one or more cards for a card game, and/or a symbol for a roulette game, to enable a player to associate a wager with one or more betting lines. The MAXBET switch 38 enables a player to input the maximum bet that a player can spend against one play of a game. The PAYOUT switch 40 enables a player to receive the amount of money and/or credits awarded to the player during a gaming session, which has been credited onto the gaming device 10.

The gaming device 10 also includes a player tracking device 44 that is coupled to the gaming controller 12 for identifying the player and/or a player tracking account that is associated with the player. The player tracking account may include, but is not limited to, gaming credits available to the player for use in playing the gaming device 10. The player tracking device 44 is configured to communicate player account information between a player tracking controller (not shown) and the gaming device 10. For example, the player tracking device 44 may be used to track bonus points and/or credits awarded to the player during a gaming session and/or track bonus and/or credits downloaded to the gaming device 10 from the player tracking system. In the illustrated embodiment, the player tracking controller assigns a player status, e.g., a player ranking, based on the player account information. For example, the player tracking information may include, but is not limited to, a frequency in which the player plays a game, the average wager the player makes per play of a game, a total amount wagered by the player over a predefined period of time, and/or any other suitable player tracking information.

The player tracking device 44 is coupled to the gaming cabinet assembly 18 and includes a player identification card reader 46, a data display 48, and a keypad 50. The player identification card reader 46 is configured to accept a player tracking card (not shown) inserted by the player, and read information contained on the player tracking card to identify the player account information. The player identification card reader 46 may include, but is not limited to, a barcode reader, a magnetic card reader, and/or a radio frequency identification (RFID) card reader. The keypad 50 is configured to accept a user selection input such as, for example, a unique player personal identification number (PIN) to facilitate enabling the gaming device 10 to identify the player, and access player account information associated with the identified player to be displayed on the data display 48. In one embodiment, the data display 48 includes a touchscreen panel that includes the keypad 50. Alternatively, the data display 48 and the keypad 50 may be included in the display device 14.

In the illustrated embodiment, the display device 14 is configured to display a game 52 on a game screen 54 (shown in FIG. 7) including indicia and/or symbols for use in the game 52, e.g., cards used by a card game, roulette wheel and symbols used in a roulette game, reels used in a reel game and/or symbols and images used in a wheel-type game. The game 52 may include any type of game including, but not limited to, a video slot game, a keno game, a blackjack game, a video poker game, a wheel-type game, a roulette-type game, and/or any type of game which allows a player to make a wager, play a game, and potentially provide the player an award based on an outcome of the game and a paytable. In one embodiment, the display device 14 may include a first display 56 and a second display 58. Moreover, each display 56 and 58 may be configured to display at least a portion of the game screen 54. In the illustrated embodiment, the display device 14 is configured to display a primary game 60 (shown in FIG. 7) on the first display 56 and display a bonus award game feature 62 on the second display 58. In one embodiment, the primary game 60 and the bonus award game feature 62 may be displayed on the same display device.

In one embodiment, the first display 56, and/or the second display 58 may include a flat panel display, such as a cathode ray tube display (CRT), a liquid crystal display (LCD), a light-emitting diode display (LED), an organic light-emitting diode display (OLED), an active-matrix organic light-emitting diode display (AMOLED), a plasma display, and/or any suitable visual output device capable of displaying graphical data and/or text to a user. Alternatively, a single component, such as a touch screen, may function as both the display device 14 and as the user input device 16. In an alternative embodiment, the first display 56 and/or the second display 58 may include a plurality of mechanical reels displaying a plurality of game symbols.

Referring to FIG. 2, in one embodiment, the gaming controller 12 may include a processor, i.e., a central processing unit (CPU) 64, a credit module 66, a player selection module 68, a payout module 70, a random-number generator (RNG) 72, a lighting module 74, a sound module 76, a display module 78, a primary game module 80, a game feature module 82, a memory device 84, and a database 86. The memory device 84 includes a computer readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables the CPU 64 to store, retrieve, and/or execute instructions and/or data.

The CPU 64 executes various programs, and thereby controls other components of the gaming controller 12 according to player instructions and data accepted by the user input device 16. The CPU 64 in particular executes a game program, and thereby conducts a game in accordance with the embodiments described herein. The memory device 84 stores programs and databases used by the CPU 64. Moreover, the memory device 84 stores and retrieves information in the database 86 including, but not limited to, wagers, wager amounts, average wagers per game, a game type, awards, type of awards, a number of reels associated with a game, a number of symbols being displayed on each reel, trigger symbols, free games awards, bonus awards, primary game awards, image data for producing game images and/or screens on the display device 14, and temporarily stores variables, parameters, and the like that are used by the CPU 64. In addition, the memory device 84 stores indicia, symbol weights, symbol values, paytables, selection probabilities, and/or winning combination tables which represent relationships between combinations of random numbers and types of awards. In one embodiment, the memory device 84 utilizes RAM to temporarily store programs and data necessary for the progress of the game, and EPROM to store, in advance, programs and data for controlling basic operation of the gaming device 10, such as the booting operation thereof.

The credit module 66 manages the amount of player's credits, which is equivalent to the amount of coins and bills counted and validated by the bill acceptor 26. The player selection module 68 monitors player selections received through the input buttons 22, and accepts various instructions and data that a player enters through the input buttons 22. The payout module 70 converts a player's credits to coins, bills, or other monetary data by using the coin hopper 28 and/or for use in dispensing a credit voucher via the bill acceptor 26.

The lighting module 74 controls one or more lighting devices 32 to blink and/or change brightness and color in specific patterns in order to produce lighting effects associated with game play. The sound module 76 controls the speakers 30 to output voice announcements and sound effects during game play.

The display module 78 controls the display device 14 to display various images on a graphical interface including the game screen 54 preferably by using computer graphics and image data stored in the memory device 84. More specifically, the display module 78 controls video reels being displayed with the primary game 60 and secondary game symbols and images being displayed with the bonus award game feature and/or the free game feature in the game screen 54 displayed on the first display 56 and/or the second display 58 by using computer graphics and the image data. In another embodiment, the display device 14 includes a plurality of mechanical reels. The display module 78 is configured to control a rotation of each of the plurality of mechanical reels to spin and stop each reel to display a game outcome.

The RNG 72 generates and outputs random numbers to the CPU 64 preferably at the start of each round of a game. The CPU 64 uses the random numbers to determine an outcome of the games. For example, if the game is a video slot game, the CPU 64 uses the RNG 72 to randomly select an arrangement of symbols to be displayed on video reels. Moreover, the CPU 64 generally uses random numbers generated by the RNG 72 to play the games and to determine whether or not to provide an award to a player. In one embodiment, the CPU 64 may also use the random numbers to determine a stop position of each reel for use in stopping each of a plurality of mechanical reels being displayed in the display device 14 to display the game outcome. The CPU 64 may also receive combinations of random numbers from the RNG 72 and compare the generated combinations with winning combinations stored in the winning combination table to determine if the generated outcome is a winning outcome that is associated with a type of award. In general, the term "award" may be a payout, in terms of credits or money. Thus, the CPU 64 may award a regular payout in response to the outcome of the game 52. However, it should be noted that the term award may also refer to other types of awards, including, prizes, e.g., meals, show tickets, etc. . . . , as well as in-game award, such as bonus features, free games, and/or free spins, or awarding the player one or more wild symbols or stacked wild symbols in each of the games. The RNG 72 may be implemented in software, firmware or hardware. An implementation of software RNG 72 may include a random generator program that is executed by CPU 64 or other processing unit.

The primary game module 80 includes a game program for use in executing the primary game 60 being displayed on the display device 14. In the illustrated embodiment, the primary game 60 is a video slot game. However, it should be noted that the primary game 60 may be any type of game upon which a player could make a wager including, but not limited to a keno game, a blackjack game, a video poker game, or any type of game that enables the gaming controller 12 to function as described herein. During play of the primary game 60, the primary game module 80 retrieves image data from the database 86 and displays the primary game 60 including a plurality of reels, each being displayed with the plurality of symbols. The primary game module 80 receives one or more wagers from the player via the user input device 16, responsively generates and outcome of the primary game 60, determines if the game outcome is a winning outcome, and provides an award to the player, if any, as a function of game outcome and the wager. Moreover, the primary game module 80 receives one or more random numbers from the RNG 72, determines an outcome of the primary game 60 as a function of the received random numbers, and spins and stops the reels to display the outcome of the primary game 60 on the display device 14.

The game feature module 82 includes a game program for use in executing the bonus award game feature 62 and/or a free game feature 88 (shown in FIG. 13A-13D). In the illustrated embodiment, the game feature module 82 is configured to detect one or more triggering conditions occurring in the outcome of the primary game 60 and to initiate the bonus award game feature 62 and/or the free game feature 88 upon detecting the triggering conditions. For example, in one embodiment, the game feature module 82 may be configured to detect a first triggering condition appearing in the outcome of the primary game and responsively initiate a bonus award game feature 62 upon detecting the first triggering condition, and detect a second triggering condition appearing in the outcome of the primary game and responsively initiate the free game feature 88 upon detecting the second triggering condition. The game feature module 82 may also be configured to display the free game feature 88 after displaying the bonus award game feature 62.

In one embodiment, the first and second triggering condition may be defined as the appearance of one or more identical special trigger symbols appearing in the primary game outcome. For example, the first triggering condition may be defined as a predefined number of identical special trigger symbols being displayed in the primary game outcome, and the second triggering condition may be defined the trigger symbols being displayed in a predefined arrangement. For example, the second triggering condition may be defined as a predefine number of identical special trigger symbols being adjacently displayed within the primary game outcome. In the illustrated embodiment, the game feature module 82 is configured to initiate both the free game feature 88 and the bonus award game feature 62 if the first and the second triggering conditions each occur in the same primary game outcome.

Figure 9:
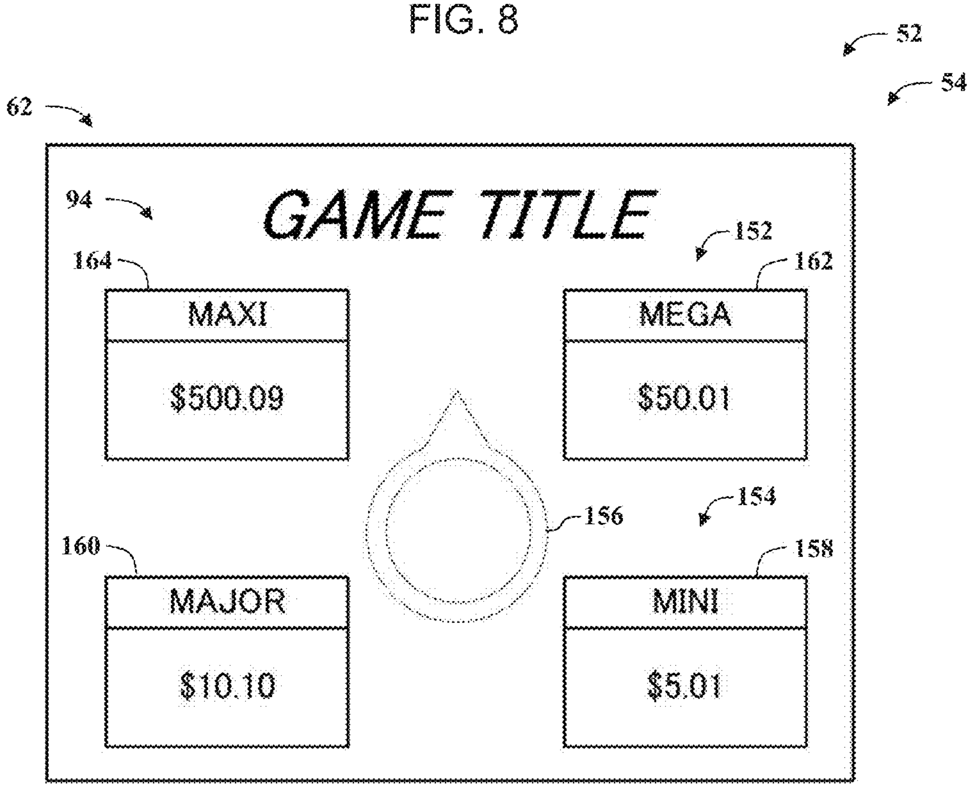
FIG. 9 is an exemplary entertaining graphical display of a game screen including a bonus award game that may be displayed on the gaming device shown in FIG. 1, according to an embodiment of the present invention.

In the illustrated embodiment, the game feature module 82 includes a free game feature unit 90 and a bonus award game feature unit 92. The bonus award game feature unit 92 includes a game program for use in executing the bonus award game feature 62. The bonus award game feature unit 92 is configured to evaluate the outcome of the primary game 60 to detect an occurrence of the first triggering condition appearing in the primary game outcome, and responsively initiate the bonus award game feature 62. For example, in one embodiment, the bonus award game feature unit 92 may detect the appearance of one or more special trigger symbols appearing in the outcome of the primary game 60 and responsively initiate the bonus award game feature 62. The bonus award game feature unit 92 may also determine a probability of initiating a bonus award game 94 (shown in FIG. 9) as a function of the number of trigger symbols being displayed in the primary game outcome and determine whether to initiate the bonus award game as a function of the determined probability.

The bonus award game feature unit 92 may also initiate the bonus award game 94 including a spin selection for each trigger symbol being displayed in the primary game outcome. Each spin selection is used to randomly determine a number of instances of the bonus award game 94 being provided to the player. During each spin selection, the bonus award game feature unit 92 randomly selects a number of instances of the bonus award game 94 that is associated with the corresponding trigger symbol. The bonus award game feature unit 92 may also replace each trigger symbol displayed in the primary game outcome with a bonus symbol that indicates the corresponding selected number of bonus award game instances. In the illustrated embodiment, the bonus award game feature unit 92 is configured to determine a total number of instances of the bonus award game 94 and conduct each instance including randomly selecting a bonus award and providing the selected bonus award to the player. In one embodiment, the bonus award game feature unit 92 may determine a total bonus award as a function of a value of each randomly selected bonus award and provide the total bonus award to the player. In addition, the bonus award game feature unit 92 may display the bonus award game 94 including a plurality of award images and an award selector image. During play of each instance of the bonus award game 94, the bonus award game feature unit 92 rotate and stop the award selector to indicate the corresponding selected bonus award.

The free game feature unit 90 includes a game program for use in executing the free game feature 88 (shown in FIG. 13A-13D). In the illustrated embodiment, the free game feature 88 includes one or more additional instances of the primary game. For example, the free game feature 88 may include one or more additional spins of the primary game reels. In the illustrated embodiment, the free game feature unit 90 is configured to evaluate the outcome of the primary game 60 to detect an occurrence of the second triggering condition appearing in the primary game outcome, and responsively initiate the free game feature 88. For example, in one embodiment, the free game feature unit 90 may detect the appearance of a predefined number of special trigger symbols appearing in the outcome of the primary game 60 and responsively initiate the free game feature 88. In another embodiment, the free game feature unit 90 may detect a relative position of each of the special trigger symbols and initiate the free game feature 88 if a predefined number of special trigger symbols are displayed in adjacent positions in the primary game outcome. In addition, the free game feature unit 90 may also determine a number of free games and/or additional instances of the primary game to be awarded to the player as a function of the number of special trigger symbols appearing the initial primary game outcome.

During the free game feature 88, the free game feature unit 90 sequentially initiates each free game, and spins and stops the primary game reels to display each outcome of each corresponding free game. The free game feature unit 90 may also evaluate each free game outcome and responsively provide an award to the player after the conclusion of each free game and/or each free spin of the reels. In one embodiment, the free game feature unit 90 may determine a total free game award as a function of the outcomes of each free game, and provide the total free game award to the player at the conclusion of the free game feature 88. In one embodiment, the free game feature may include the same reels being used in the primary game 60. In another embodiment, the free game feature may include additional reels and/or different reels.

Figure 3:
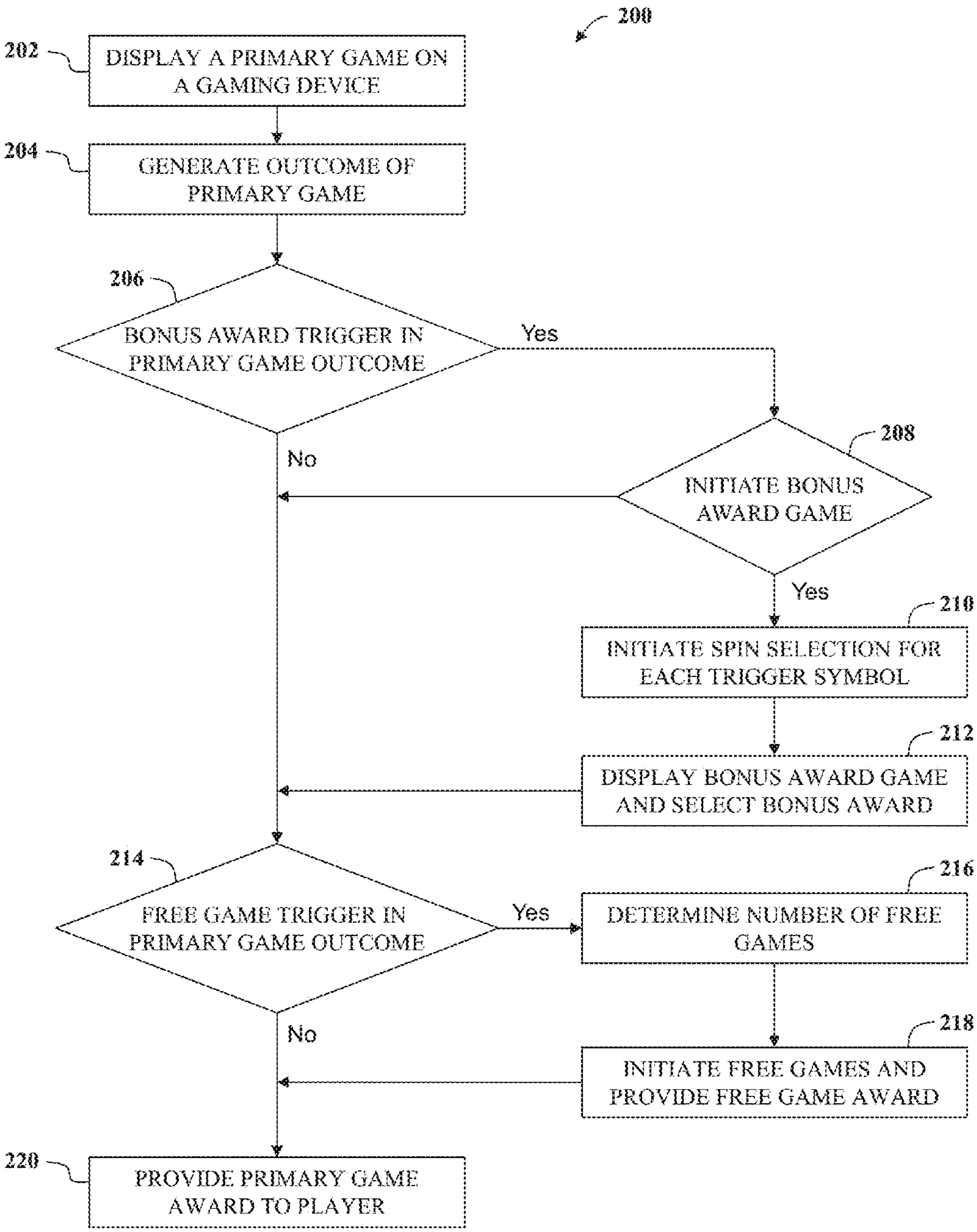
FIG. 3 is a flowchart of a method that may be used with the gaming device shown in FIG. 1 for providing a game to a player, according to an embodiment of the present invention.
Figure 4:
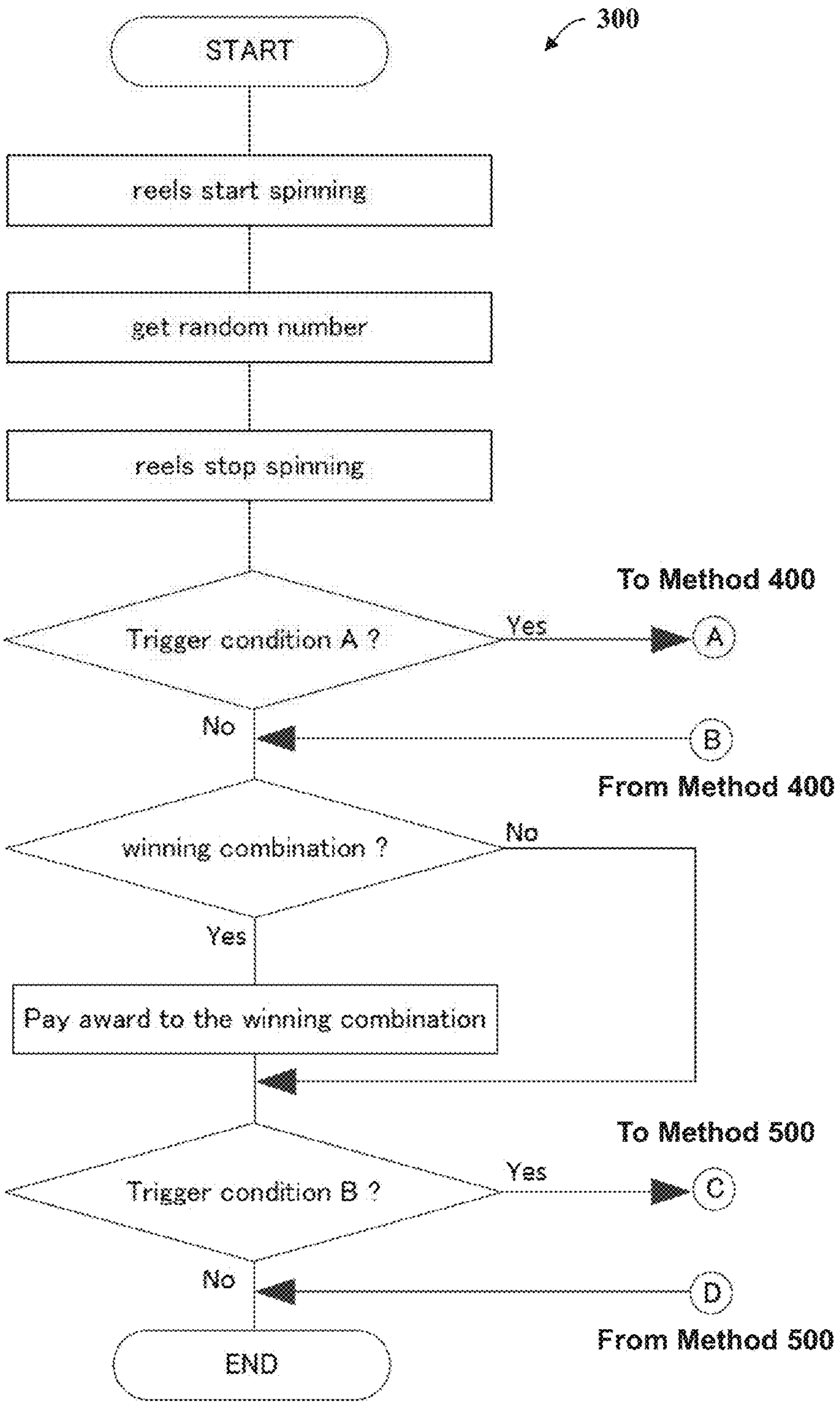
FIGS. 4-6 are flowcharts of methods that may be used with the gaming device shown in FIG. 1 for providing a game to a player, according to an embodiment of the present invention.
Figure 5:
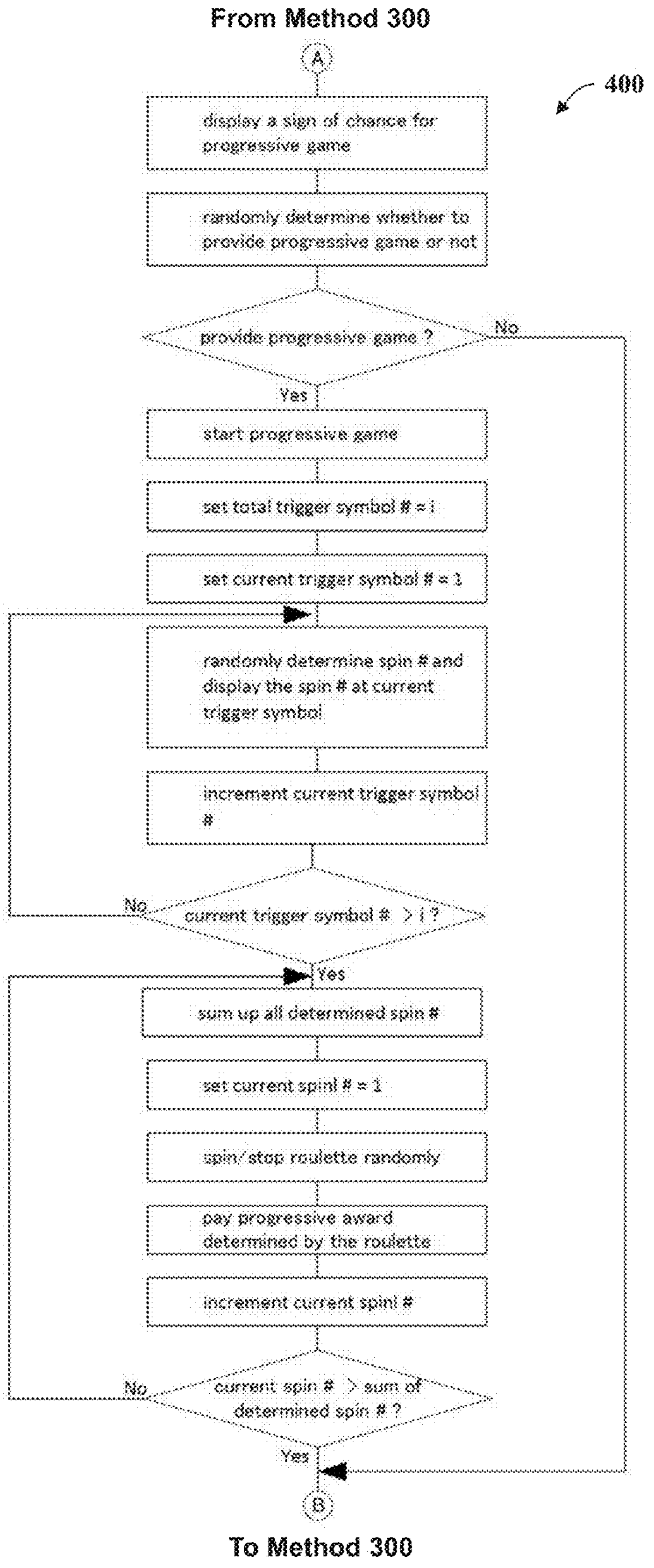
Figure 6:
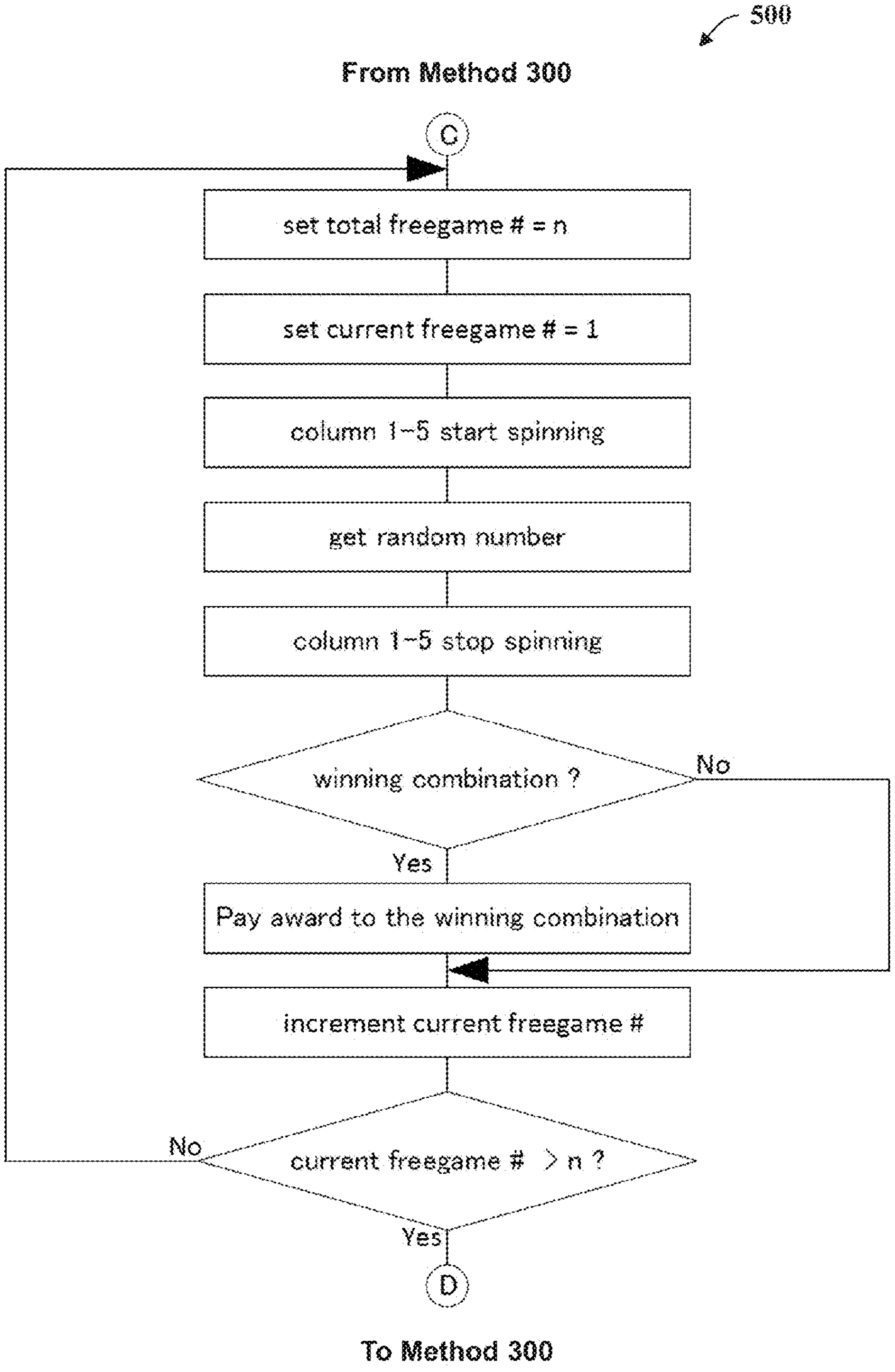
Figure 7:
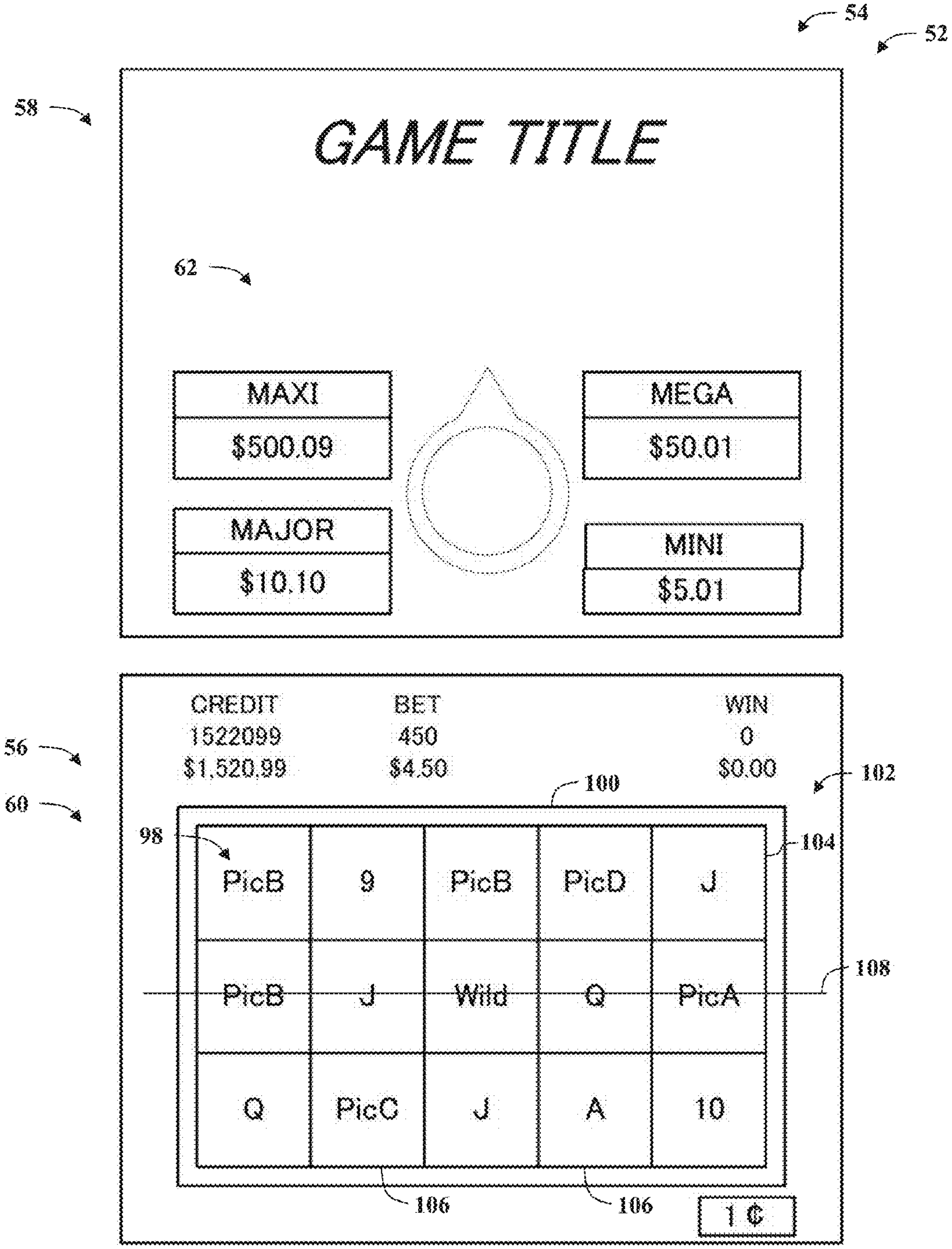
FIG. 7 is an exemplary entertaining graphical display of a game screen including a primary slot-type game that may be displayed on the gaming device shown in FIG. 1, according to an embodiment of the present invention.
Figure 8:
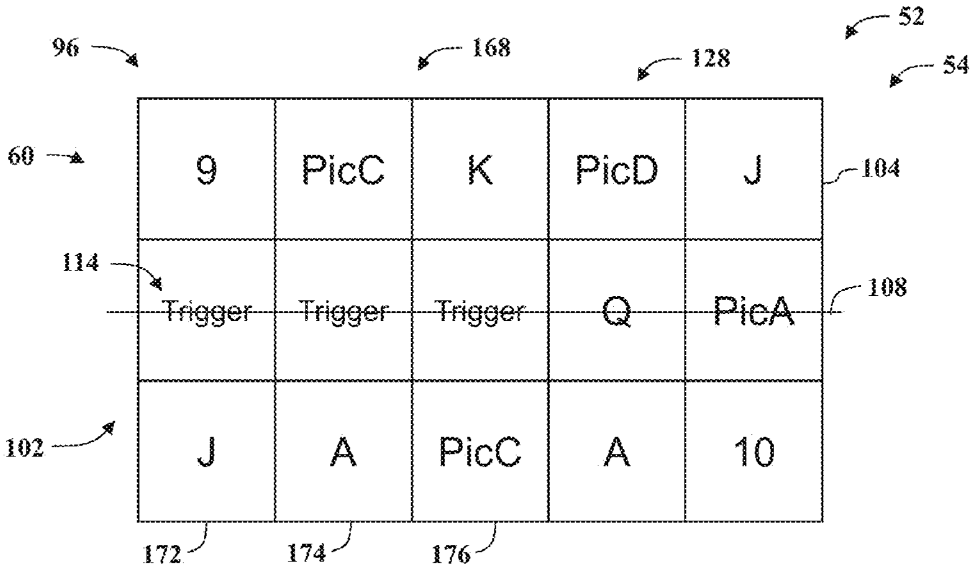
FIG. 8 is another exemplary entertaining graphical display of the game screen including the primary slot-type game shown in FIG. 7, according to an embodiment of the present invention.

FIG. 3 is a flowchart of a method 200 that may be used with the gaming device 10 to provide a primary game and a secondary game to a player. FIGS. 4-6 are flowcharts of additional methods 300, 400, and 500 that may be used by the gaming device 10 to provide the primary game, the bonus award game feature, and the free game feature to the player. The methods 200, 300, 400, and 500 include a plurality of steps. Each method step may be performed independently of, or in combination with, other method steps. Portions of the methods may be performed by any one of, or any combination of, the components of the one or more gaming devices 10. FIGS. 7 and 8 are exemplary entertaining graphical displays of the primary game 60 that may be played with the gaming device 10. FIGS. 13A-17L are exemplary entertaining graphical displays of the bonus award game feature and the free game feature that may be played on the gaming device 10.

In general, the gaming controller 12 randomly generates a primary game outcome 96, spins and stops the reels to display the primary game outcome 96, detects the appearance of first and second triggering conditions in the primary game outcome 96, and responsively provides the bonus award game feature and the free game feature to the player upon detecting the corresponding triggering condition. In the illustrated embodiment, the first and second triggering conditions each include the appearance of the same special trigger symbols. In addition, in one embodiment, the gaming controller 12 sequentially stops each reel of the primary game 60 to display the primary game outcome 96, such that an appearance of a special trigger symbol in the $1^{st}$ leftmost reel increases the probability of both the first and second triggering conditions occurring the primary game outcome 96.

In the illustrated embodiment, in method step 202, the gaming controller 12 receives a signal indicative of a wager being received by the gaming device 10 and responsively displays the primary game 60 on the display device 14. In one embodiment, the primary game 60 is a video slot game. However, it should be noted that the game 52 may be any type of game upon which a player could make a wager including, but not limited to a keno game, a blackjack game, a video poker game, or any type of game that enables the gaming controller 12 to function as described herein. In addition, in one embodiment, the game 52 may include a slot game being displayed with a plurality of mechanical reels (not shown). In the illustrated embodiment, the gaming controller 12 displays the primary game 60 on the first display 56. In another embodiment, the gaming controller 12 displays the primary game 60 on the first display 56 and/or the second display 58.

In method step 204, the gaming controller 12 randomly generates an outcome 96 of the primary game 60 and displays the generated game outcome 96 in the game screen 54. The gaming controller 12 randomly selects a plurality of game symbols 98 from a predefined set of possible game symbols, and displays the selected game symbols 98 associated with the generated game outcome 96 in the game screen 54. In the illustrated embodiment, the plurality of game symbols 98 are displayed in a display area 100 that includes a grid 102 having a plurality of cells 104 arranged along a plurality of rows and a plurality of columns. Each cell 104 displays one or more game symbols 98 associated with the game outcome 96. In the illustrated embodiment, the gaming controller 12 displays the game symbols 98 within a plurality of reels 106. Each reel 106 is associated with a corresponding column. The game 60, in the illustrated embodiment, includes 5 reels 106 with 3 cells per reel, respectively (a "5×3" arrangement) displayed in the display area 100. Alternatively, other reel arrangements may be used such as, for example, 3-4-3-4-3, 4-5-5-5-4, or 4-5-4-5-4 arrangements or arrangements with the same number of cells per column, such as 3×3, 3×4, 4×5, or 5×5 configurations. The primary game 60 may also include a plurality of paylines 108 that extend across one or more cells 104 to indicate, to the player, a combination of game symbols 98.

Figure 12:
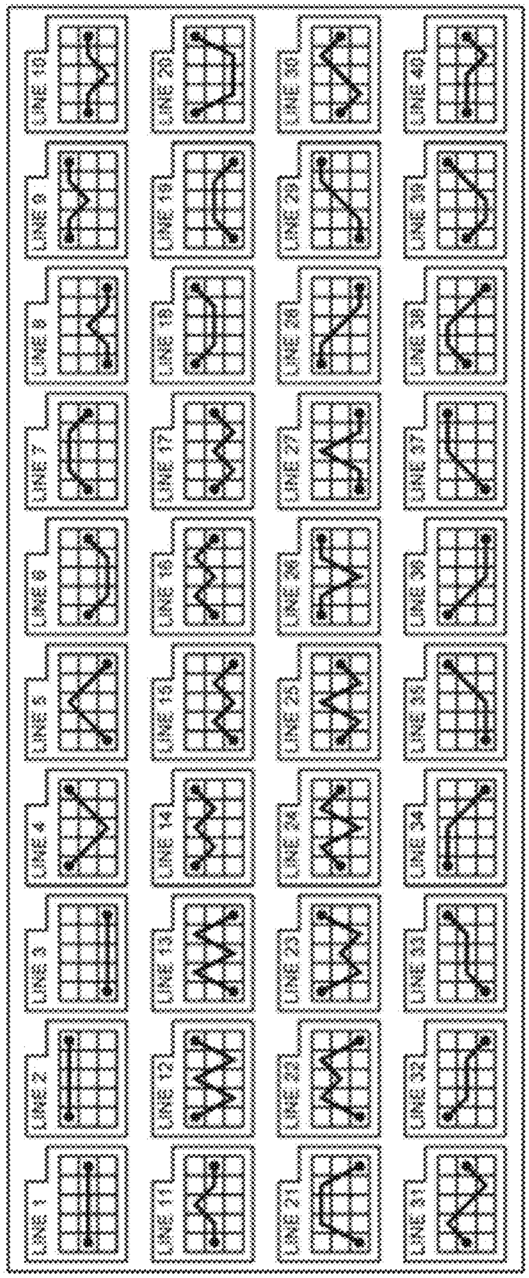
FIG. 12 is an exemplary graphical display of paylines that may be used with the primary slot-type game shown in FIG. 7, according to an embodiment of the present invention.

In the illustrated embodiment, the gaming controller 12 receives a signal, from the user input device 16, that is indicative of a player's selection to initiate a gaming session including a wager amount, and a selection of one or more paylines 108 associated with a predefined set of cells 104 within the display area 100. In the illustrated embodiment, the game 60 is a multi-line game, i.e., the paylines include horizontal paylines and/or diagonal pay-lines, and/or zig-zag paylines (shown in FIG. 12). Moreover, the user input device 16 may allow the player to toggle to increase the bet per payline a credit at a time (up to the maximum bet). The gaming controller 12 randomly generates an outcome of the primary game 60, and displays the generated outcome on the game screen 54. In one embodiment, the gaming controller 12 is configured to rotate, and/or spin each reel 106 to initiate a game play, and stop each reel 106 to display a plurality of game symbols 98 associated with the randomly generated outcome (shown in FIGS. 8 and 13A-13D). In addition, the gaming controller 12 is adapted to determine if the generated outcome is a winning outcome as a function of the displayed game symbols 98, a paytable, a wager, and one or more player selected paylines 108. More specifically, the gaming controller 12 determines if a combination of symbols 98 arranged along the selected payline 108 is a winning combination. The gaming controller 12 may provide an award in response to the outcome of the game 60.

Each primary game 60 is generally played in a conventional manner. The player makes a wager, which may be based on a predetermined denomination and a selected number of paylines 108, the gaming controller 12 randomly generates an outcome for the game 60, spins the reels 106, and selectively stops the reels 106 to display a game symbol 98 in each of the display cells 104. If a predetermined pattern of game symbols 98 is randomly chosen for each cell 104 on a played payline 108, the player may be awarded a payout based on the payline, the wager, and a predetermined paytable. Moreover, the player may be awarded a payout if the combination of game symbols 98 associated with a selected payline 108 is a winning combination. In addition, a player may receive a bonus feature, bonus games, and/or free games based on the combination of game symbols 98 associated with the selected payline 108 and/or the appearance of one or more special game symbols in the game outcome 96. Many variations to the above described general play of a slot game fall within the scope of the present invention. Such slot games are well-known in the art, and are therefore not further discussed.

Figure 10:
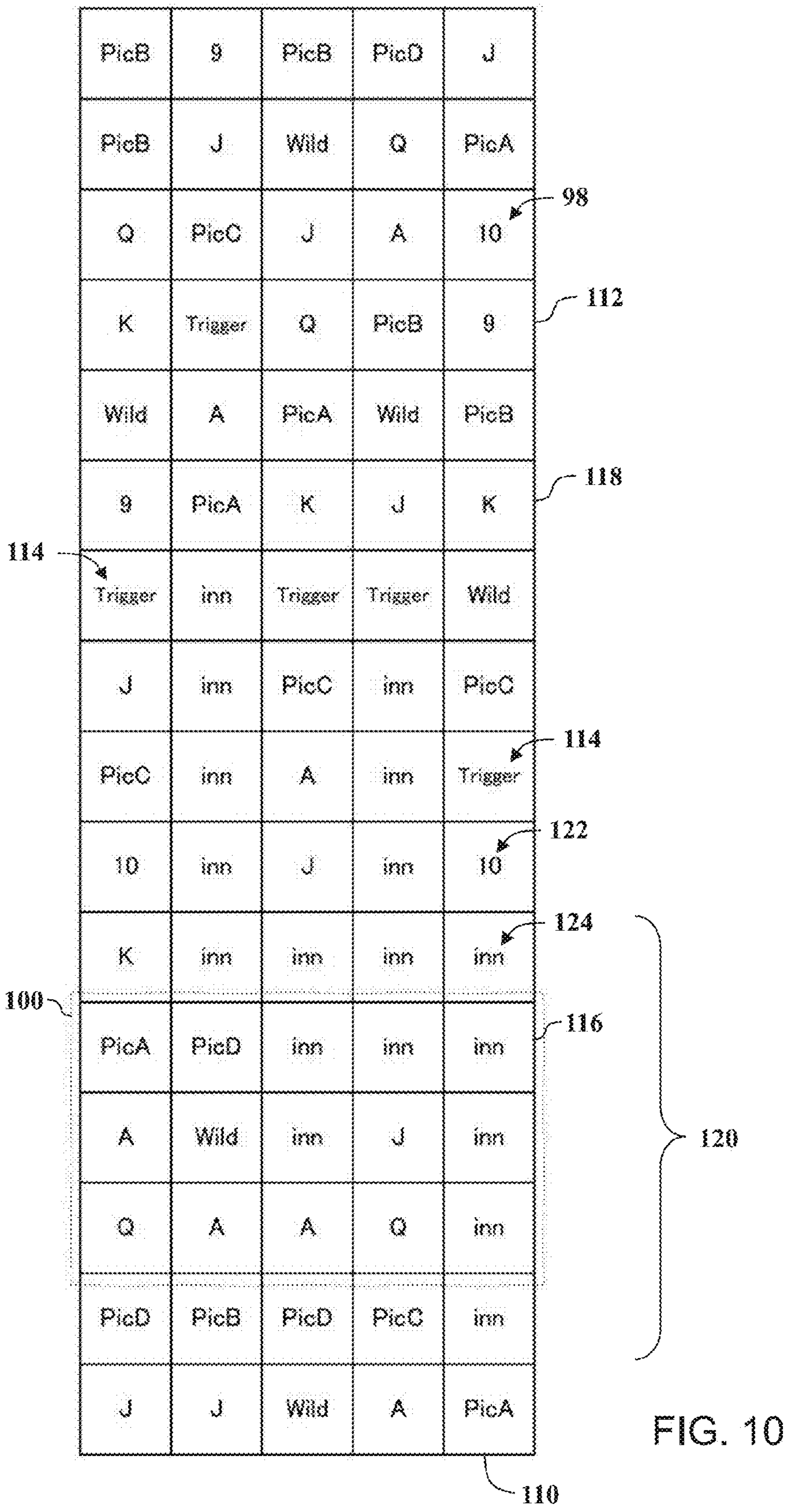
FIG. 10 is schematic representation of reel strips that may be used with the primary slot-type game shown in FIG. 7, according to an embodiment of the present invention.
Figure 11:
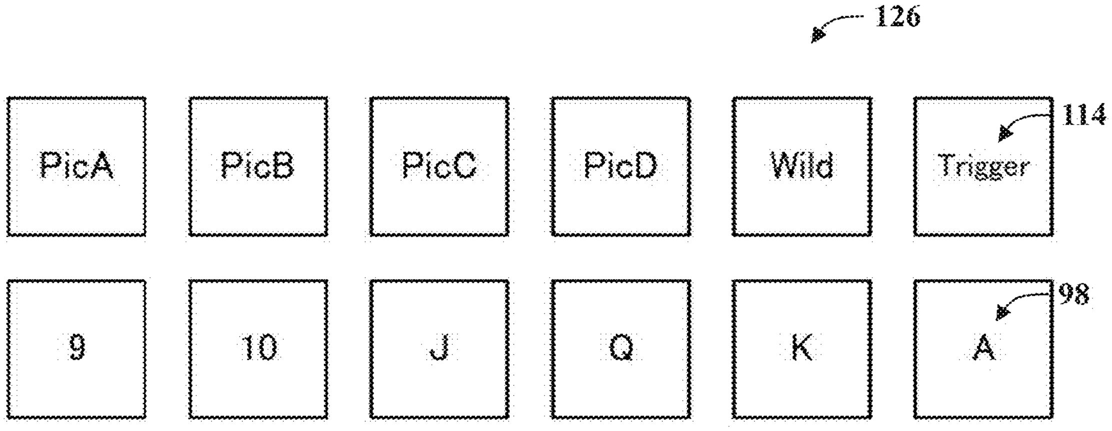
FIG. 11 is an illustration of a set of gaming symbols that may be used by the gaming device show in FIG. 1, according to an embodiment of the present invention.

In one embodiment, referring to FIG. 10, the gaming controller 12 may display one or more of the reels with reel strips 110 that includes a plurality of symbol positions 112 that each have a game symbol 98 displayed therein. In the illustrated embodiment, each reel strip 110 includes one or more special trigger symbols 114. In one embodiment, each reel strip 110 may include one or more identical special trigger symbols 114. In another embodiment, the special trigger symbols 114 may be included in a predefined set of trigger symbols that include different special trigger symbols 114. During display of the game, the gaming controller 12 spins each reel 106 such that the game symbols 98 are moved through each of the cells 104 in the display area 100. In the illustrated embodiment, one or more reel strips 110 includes a plurality of special symbol positions 116, a plurality of normal symbol position 118, and at least one set of action stacked symbols that includes a run 120 of consecutive symbol positions 112 including a plurality of adjacent special symbol positions 116. Each normal symbol position 118 includes a static normal symbol 122 that is not replaced during each instance of the game. During each play of the game, the gaming controller 12 randomly selects at least one special symbol 124 from the predefined set 126 of symbols 98 (shown in FIG. 11), and displays the selected special symbol 124 in each special symbol position 116 included in the action stacked symbols 120. In one embodiment, the predefined set 126 of symbols 98 may include the special trigger symbol 114.

In one embodiment, one or more reel strips 110 may include a plurality of runs 120 of consecutive special symbol positions 116. For example, in one embodiment, a reel strip 110 may include at least two runs 120 of consecutive special symbol positions 116. During game play, the gaming controller 12 randomly selects a special symbol 124 and displays the selected special symbol 124 in each special symbol position 116 of the runs 120 of consecutive special symbol positions 116. Moreover, the reel strip 110 may include at least one normal symbol position 118 displayed between the runs 120 of consecutive special symbol positions 116. In addition, in one embodiment, the gaming controller 12 may randomly select a different special symbol 124 to be displayed in each of the runs 120 of consecutive special symbol positions 116 and display a corresponding selected special symbol 124 in each special symbol position 116 of the associated run 120 of consecutive special symbol positions 116. Additional details of action stacked symbols includes runs of consecutive symbol positions, which may be used in the present invention, are described in U.S. patent application Ser. No. 11/299,009 to Yoshimi, now U.S. Pat. No. 8,096,869, filed Dec. 9, 2005, titled "Gaming Machine with Runs of Consecutive Identical Symbols", which is incorporated herein by reference in its entirety.

Figure 14A:
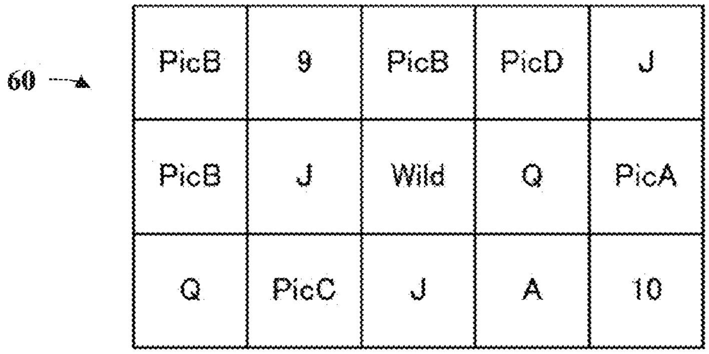
FIGS. 14A-14H are exemplary entertaining graphical displays of a bonus award game feature that may be displayed on the gaming device shown in FIG. 1, according to an embodiment of the present invention.
Figure 14B:
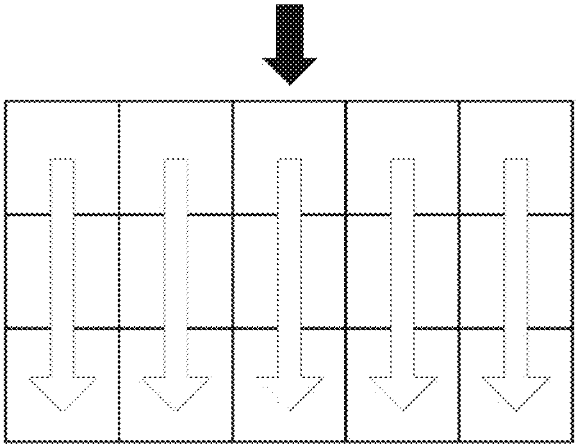
Figure 14C:
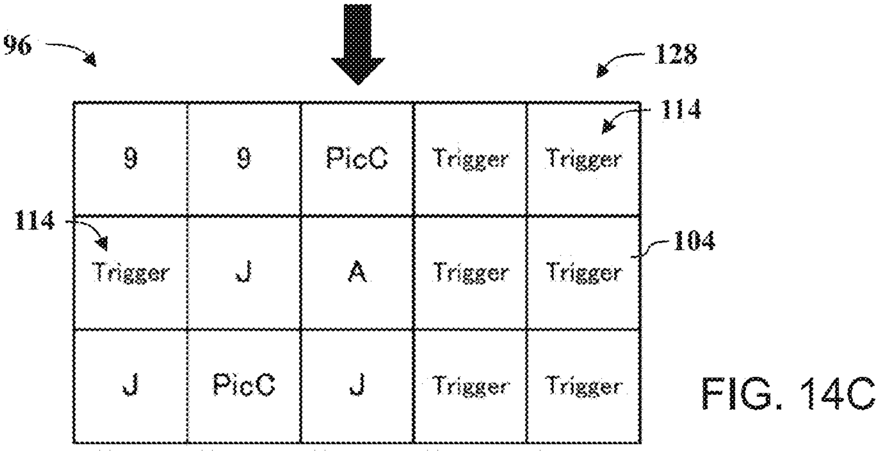
Figure 14D:
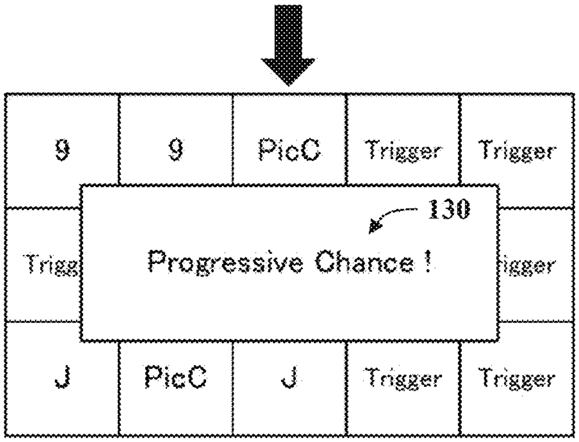
Figure 14E:
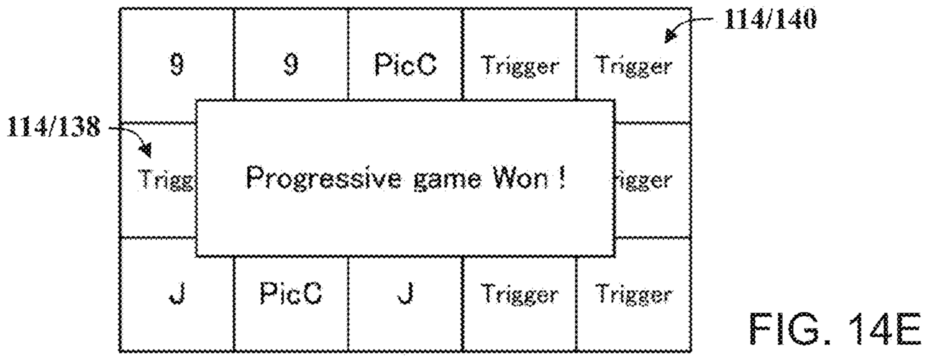
Figure 14F:
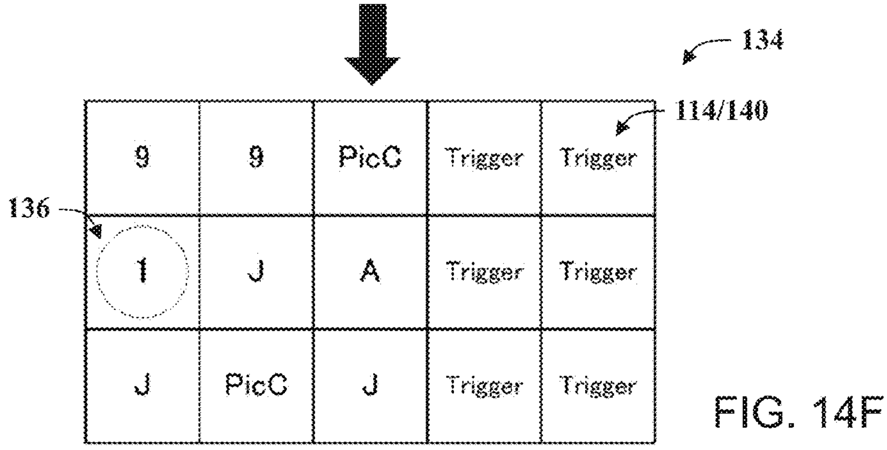
Figure 14G:
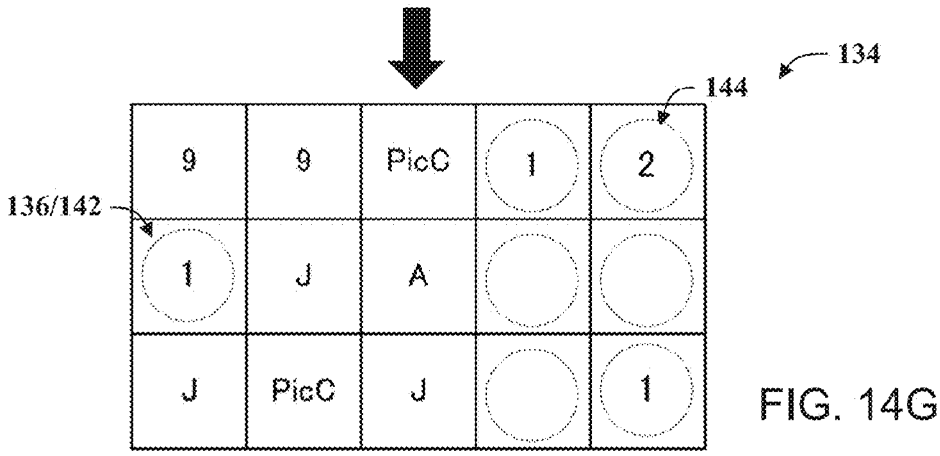
Figure 14H:
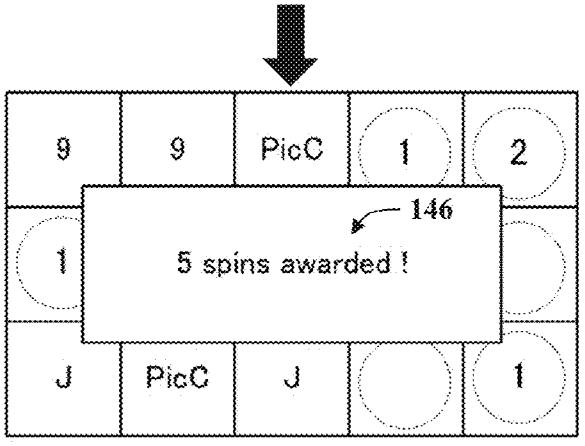

In method step 206, as shown in FIGS. 14A-14D, the gaming controller 12 determines if a first triggering condition 128 associated with the bonus award game feature 62 occurs with the primary game 60. If the first triggering condition is detected, the gaming controller 12 initiates method step 208 to determine whether to initiate the bonus award game feature 62. In another embodiment, the gaming controller 12 may initiate method 400. If the first triggering condition is not detected with the primary game 60, the gaming controller 12 initiates method step 214 and determines whether the second triggering condition associated with the free game feature 88 has been detected. Referring to FIGS. 8 and 14C, in method step 206, the gaming controller 12 evaluates the outcome of the primary game 60 to determine if the first triggering condition 128 has occurred in the primary game outcome. In the illustrated embodiment, the first triggering condition 128 is defined as one or more special trigger symbols 114 being in displayed in the grid 102 with the reels 106 stopped. In one embodiment, the first triggering condition 128 may include a predefined number of special trigger symbols 114 occurring in any cell 104 within the grid 102. For example, as shown in FIG. 8, the first triggering condition 128 may include three or more special trigger symbols 114 appearing in the grid 102 in the outcome of the primary game 60. In one embodiment, the first triggering condition 128 may include three or more identical special trigger symbols 114 being displayed in the grid 102 in the primary game outcome.

In method step 208, upon detecting the first triggering condition 128, the gaming controller 12 displays a progressive chance notification image 130 on the game screen and determines whether to initiate the bonus award game 94. If the gaming controller 12 determines that the bonus award game 94 is being initiated, the gaming controller 12 proceeds to method step 210. If the gaming controller 12 determines that the bonus award game 94 is not being initiated, the gaming controller 12 proceeds to method step 214 and determines whether the second triggering condition associated with the free game feature 88 has been detected.

In the illustrated embodiment, in method step 208, the gaming controller 12 determines a number of special trigger symbols 114 being displayed in the primary game outcome 96, and determines a probability of initiating the bonus award game 94 as a function of the number of trigger symbols being displayed in the grid 102. The gaming controller 12 also determines whether to initiate the bonus award game 94 as a function of the determined probability. For example, in one embodiment, the gaming controller 12 may access a bonus award game probability table 132 (shown in FIG. 20) being stored in the database 86, and determine a probability of initiating the bonus award game 94 as a function of the bonus award game probability table 132. The bonus award game probability table 132 includes a plurality of probability records that include a number of trigger symbols and an associated probability of initiating the bonus award game 94. Upon determining a number of trigger symbols 114 being displayed in the primary game outcome 96, the gaming controller 12 accesses the bonus award game probability table 132 to select a corresponding initiation probability, and randomly determines whether to initiate the bonus award game 94 as a function of the corresponding initiation probability.

In method step 210, as shown in FIGS. 14E-14H, upon initiating the bonus award game 94, the gaming controller 12 initiates a spin selection feature 134 for each trigger symbol 114 being displayed in the grid 102 to determine a number of spins and/or instances of the bonus award game will be provided to the player. During each spin selection feature 134, the gaming controller 12 randomly selects a number of spins and/or instances of the bonus award game 94 being associated with the corresponding trigger symbol 114. In one embodiment, the gaming controller 12 replaces each trigger symbol 114 with a bonus symbol 136 indicating the corresponding selected number of instances.

For example, as shown in FIG. 14E-14H, in one embodiment, the primary game outcome 96 may include a plurality if identical trigger symbols 114 including a first trigger symbol 138 and a second trigger symbol 140. The gaming controller 12 initiates a first spin selection associated with the first trigger symbol 138, and initiates a second spin selection feature associated with the second trigger symbol 140. During the first spin selection, the gaming controller 12 randomly selects a first number of spins and/or game instances being associated with the first trigger symbol 138 and replaces the first trigger symbol 138 with a first bonus symbol 142 indicated the first number of spins being provided to the player. Similarly, during the second spin selection, the gaming controller 12 randomly selects a second number of spins and/or game instances being associated with the second trigger symbol 140 and replaces the second trigger symbol 140 with a second bonus symbol 144 indicated the second number of spins provided to the player. In the illustrated embodiment, the gaming controller 12 determines a total number of instances of the bonus award game 94 and displays a notification image 142 on the game screen notifying the player of the number of spins being provided in the bonus award game 94. In one embodiment, during each spin selection, the gaming controller 12 may randomly select between 0 to 3 free spins. For instance, the gaming controller 12 may select a number of spins with a probability corresponding to a bet amount per payline, a number of selected paylines, and/or a total amount of wager. In another embodiment, any number of free spins may be awarded during each spin selection.

Figure 15A:
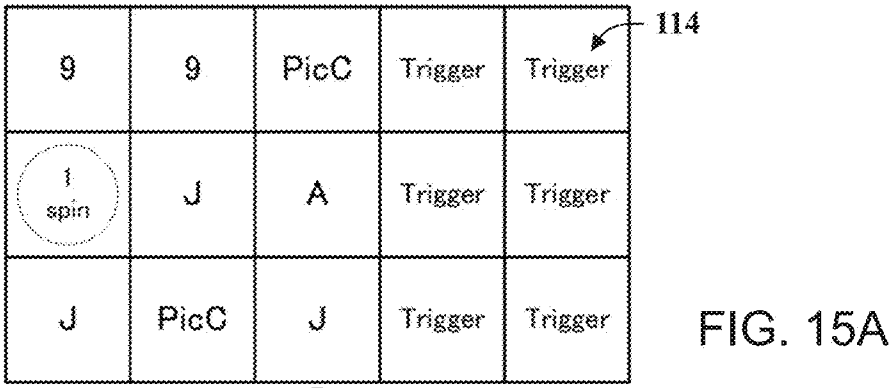
FIGS. 15A-15C are exemplary entertaining graphical displays of the bonus award game feature shown in FIG. 14A-14H, according to an embodiment of the present invention.
Figure 15B:
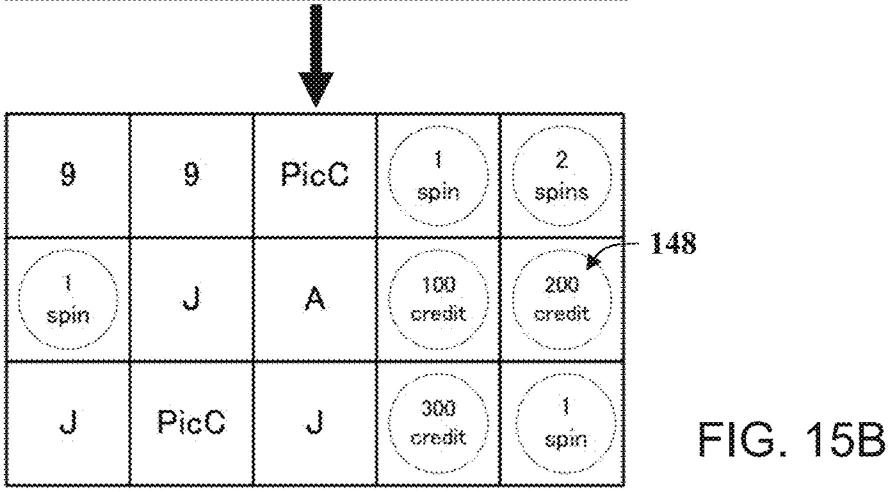
Figure 15C:
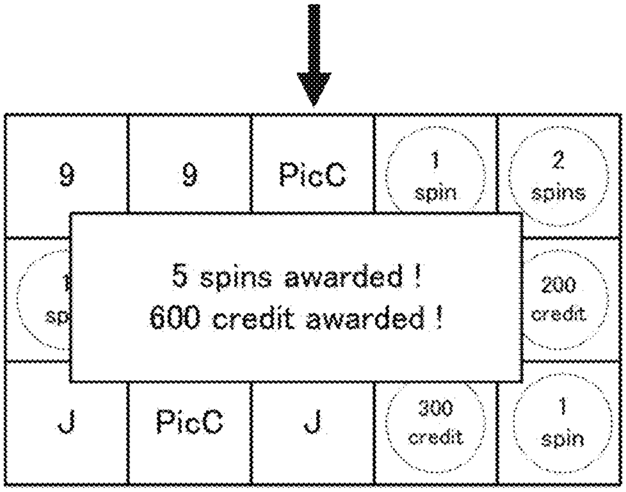
Figures 16A, 16B, 16C, 16D:
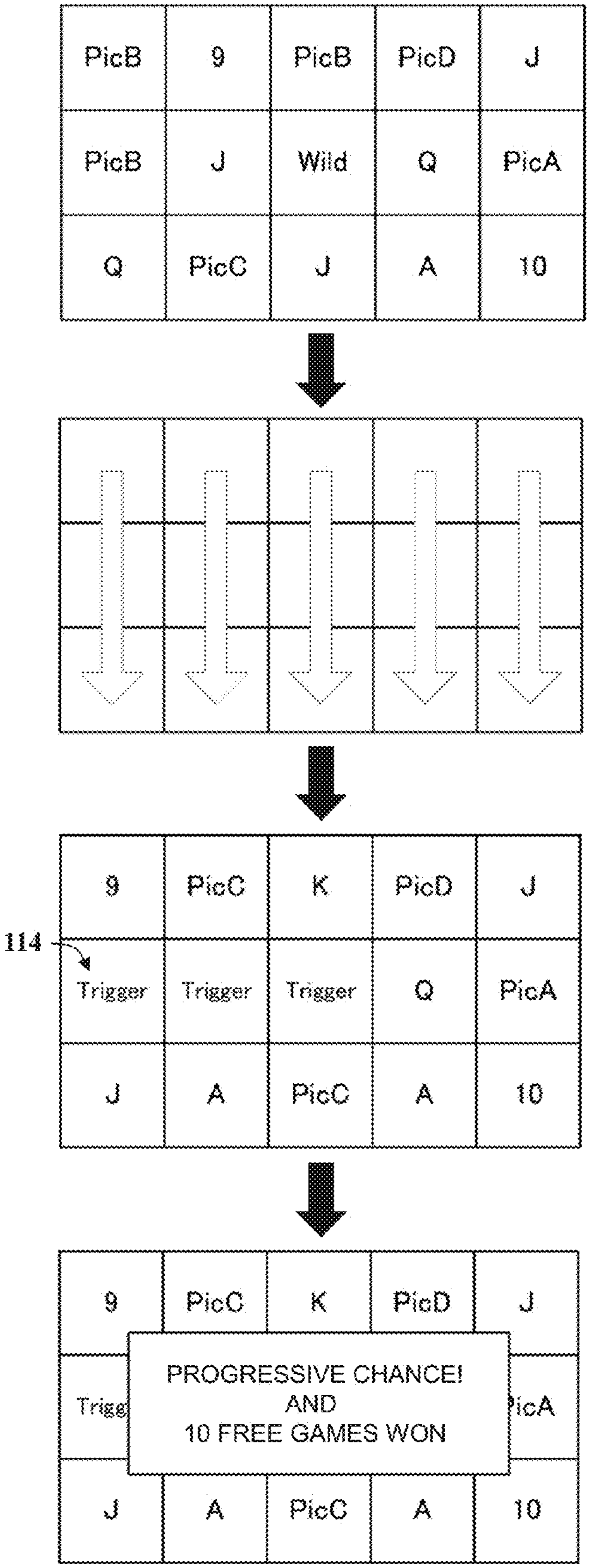
FIGS. 16A-16D are exemplary entertaining graphical displays of a bonus award game trigger and a free game trigger that may be displayed with the primary slot-type game shown in FIG. 7, according to an embodiment of the present invention.

In one embodiment, as shown in FIGS. 15A-15C, the gaming controller 12 randomly select one or more displayed trigger symbols 114 and randomly select a credit prize 148 associated with the corresponding selected trigger symbol 114. For example, the gaming controller 12 may detect a first triggering condition 128 including 7 displayed trigger symbol 114. The gaming controller 12 may randomly select 3 of the trigger symbols 114, and for each selected trigger symbol 114, randomly select a credit prize 148 and replace the corresponding trigger symbol with an image of the selected credit prize 148. The gaming controller 12 then conducts a spin selection for each remaining trigger symbol 114.

In method step 212, as shown in FIGS. 9 and 17A-17L the gaming controller 12 displays the bonus award game 94 on the game screen 54 and initiates each spin and/or instance 150 of the bonus award game 94 being provided to the player. During each instance of the bonus award game 94, the gaming controller 12 randomly selects a bonus award from a predefined set of bonus awards, and provides the player each selected bonus award. In one embodiment, each bonus award included in the set of bonus awards may have a different award value. The award value may include a monetary amount, an amount of gaming credits, additional game features, and/or any suitable award. In the illustrated embodiment, the gaming controller 12 displays the bonus award game 94 including a plurality of award images 152 indicating a plurality of bonus awards 154 and an award selector image 156. In the illustrated embodiment, the award selector image 156 includes a needle that rotates about a centerline axis. In another embodiment, the award selector image 156 may include a roulette wheel, a ring, a wheel, and/or any image that may be suitable to indicate a selected award. Each award image 150 indicates a corresponding bonus award that is available to the player during the bonus award game 94. For example, in the illustrated embodiment, the bonus award game 94 includes a MINI jackpot award 158, a MAJOR jackpot award 160, a MEGA jackpot award 162, and a MAXI jackpot award 164. In addition, the gaming controller 12 may also display the number of remaining spins (shown in FIG. 17A) and/or game instances with the award selector image 156. During each spin 150 and/or instance of the bonus award game 94, the gaming controller 12 randomly selects a bonus award 152, and spins and stops the award selector image 156 to indicate the selected bonus award 152.

Figures 17A, 17B, 17C, 17D, 17E, 17F:
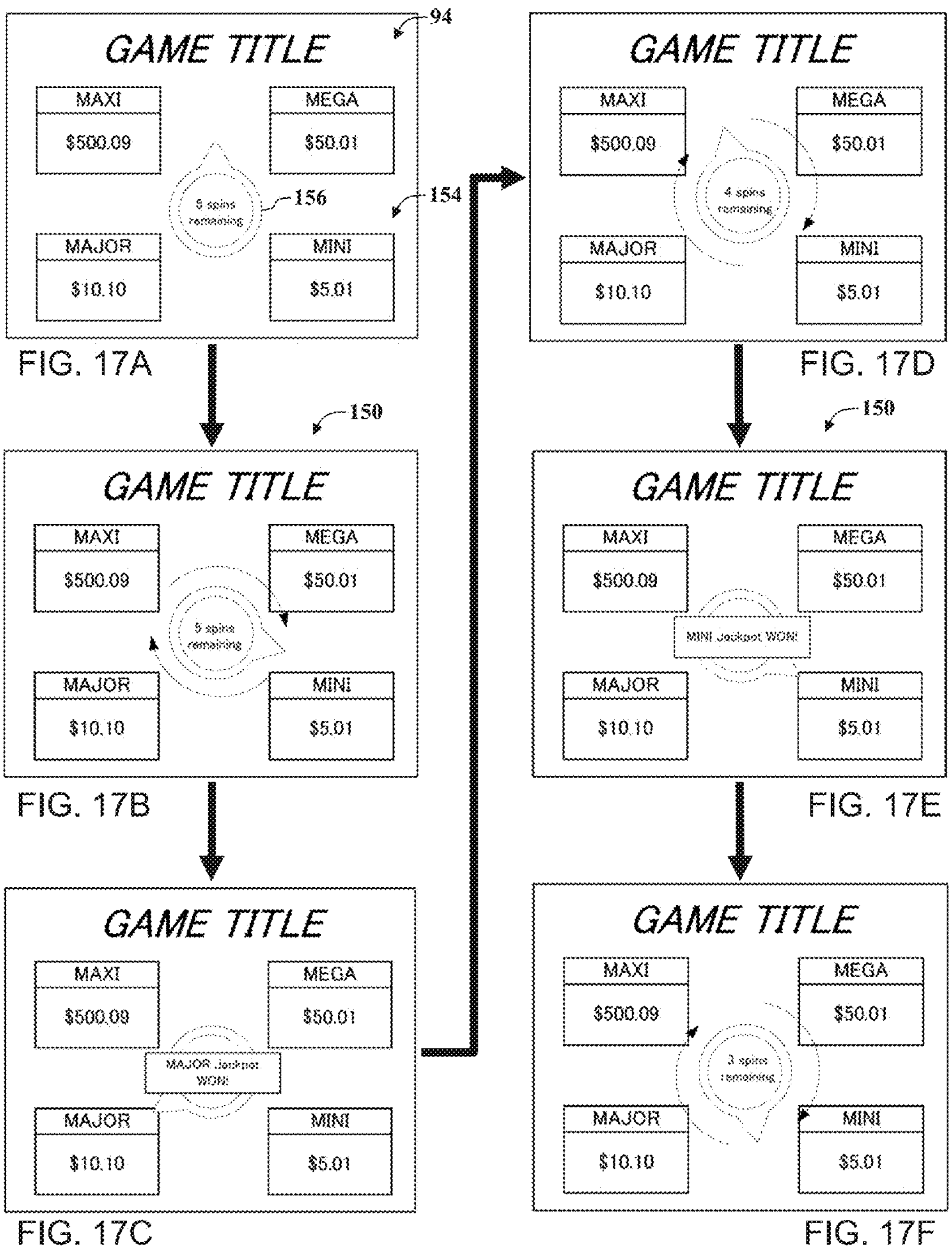
FIGS. 17A-17L are exemplary entertaining graphical displays of a bonus award game feature that may be displayed on the gaming device shown in FIG. 1, according to an embodiment of the present invention.
Figures 17G, 17H, 17I, 17J, 17K, 17L:
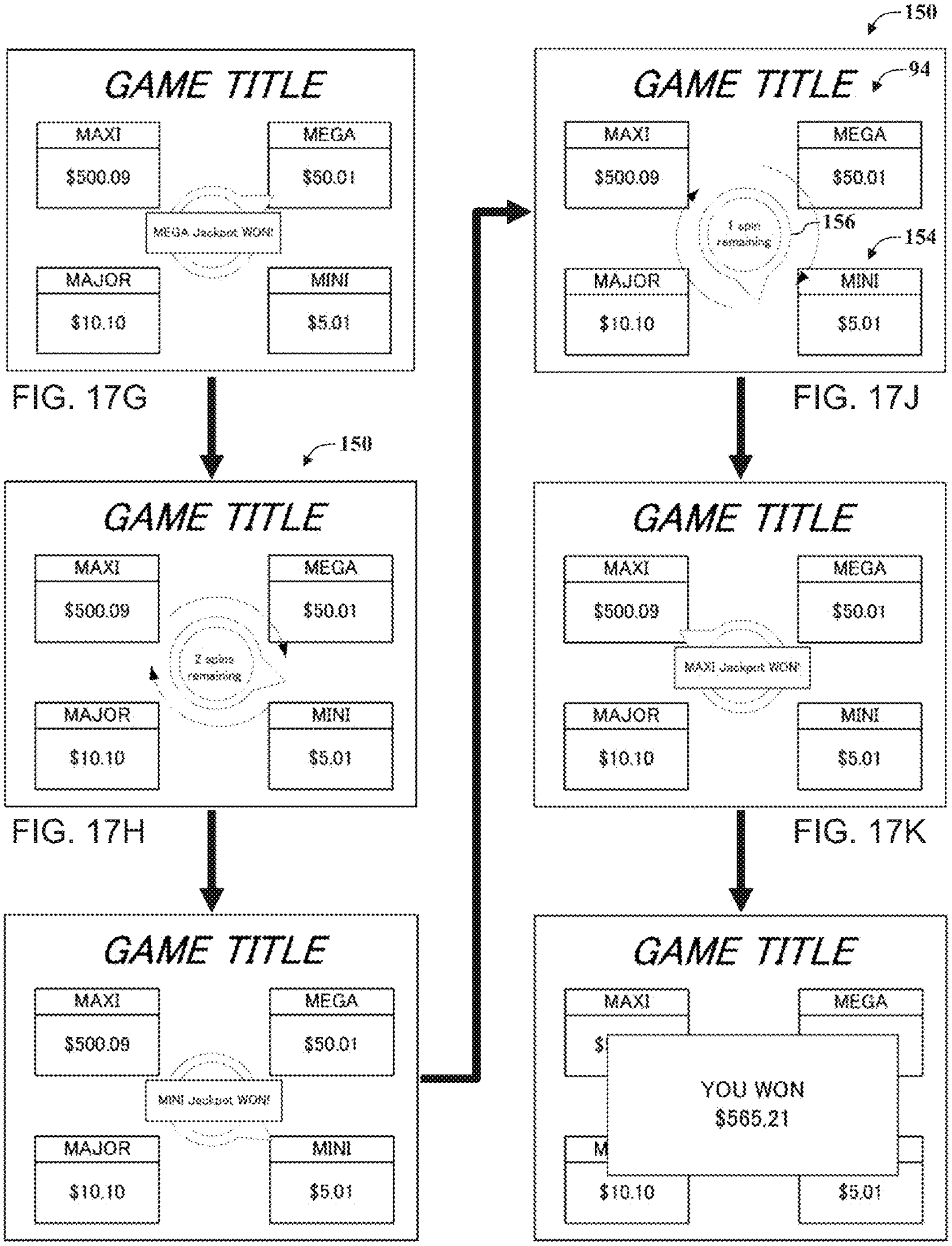

For example, as shown in FIGS. 17A-17L, during a first spin of the bonus award game 94, the gaming controller 12 randomly selects a bonus award, rotates the award selector image 156 in a spinning motion, and stops the award selector image 156 such that the award selector image 156 points, or indicates, the selected bonus award 152. The gaming controller 12 also display a notification of the selected bonus award 152, as shown in FIG. 17C. Upon completion of the spin, the gaming controller 12 determines if any additional spins remain, and responsively initiates another award selection, and spins and stops the award selector image 156 to indicate the additional selected award. The gaming controller 12 continues to select awards and to spin and stop the award selector image 156 for each spin of the bonus award game 94 provided to the player. In one embodiment, after each instance of the bonus award game 94 has been conducted, the gaming controller 12 may determine a total bonus award as a function of a value of each randomly selected bonus award and provide the total bonus award 152 to the player. In addition, the gaming controller 12 may display an image of the total bonus award 152 to the player, as shown in FIG. 17L.

For example, during each instance of the bonus award game 94, the gaming controller 12 may access an award selection table 166 (shown in FIGS. 18 and 19) to determine a probability of selecting each of the bonus awards included in the set of bonus awards, and randomly select a bonus award as a function of the determine selection probability. In one embodiment, as shown in FIG. 18, each bonus award 152 may include a different selection probability associated with a total number of spins and/or game instances being provided in the bonus award game 94. In another embodiment, as shown in FIG. 19, each bonus award 152 may include a different selection probability associated with each spin and/or instances of the bonus award game 94. For example, as shown in FIG. 19, the probability of selecting a MINI award is different for each spin of the bonus award game 94. Further, the selection probability of each spin and/or instance may be constant.

In method step 214, as shown in FIGS. 8 and 13A-13D, the gaming controller 12 determines if a second triggering condition 168 associated with the free game feature 88 occurs with the primary game 60. If the second triggering condition 168 is detected, the gaming controller 12 initiates method step 216 to determine a number of free games 170 being provided with the free game feature 88. In another embodiment, the gaming controller 12 may initiate method 500. If the second triggering condition is not detected with the primary game 60, the gaming controller 12 initiates method step 220 and determines whether the primary game outcome 96 includes a winning combination of symbols 98 and provides a primary game award to the player as a function of the winning combination, if any.

Figure 13A:
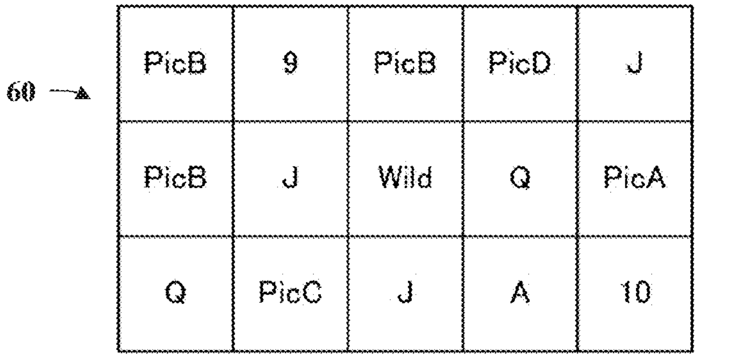
FIGS. 13A-13D are exemplary entertaining graphical displays of a free game feature that may be displayed on the gaming device shown in FIG. 1, according to an embodiment of the present invention.
Figure 13B:
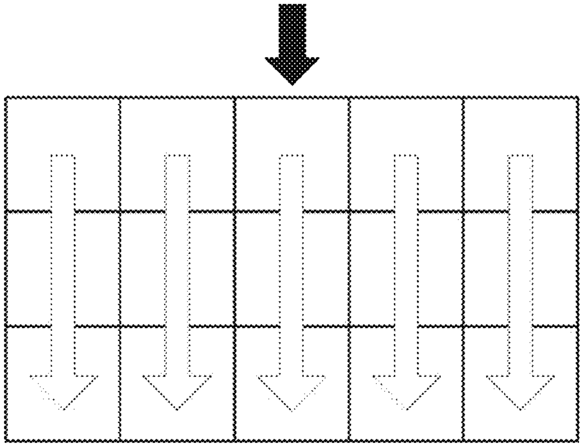
Figure 13C:
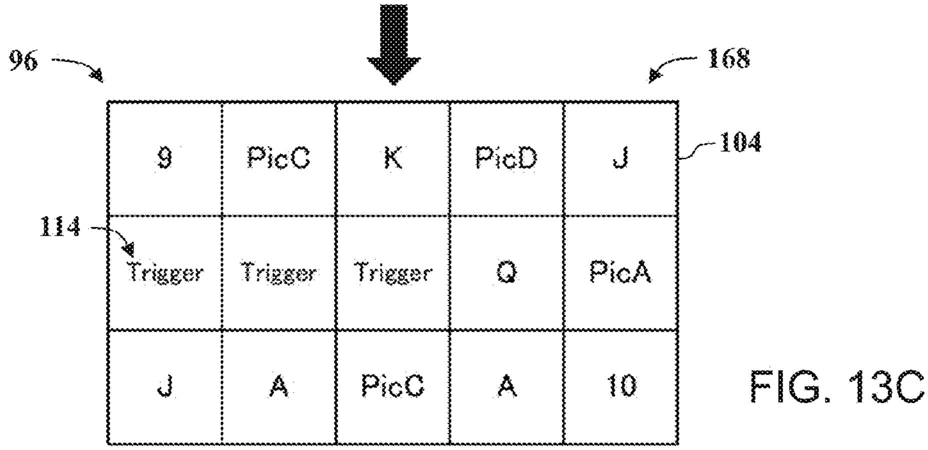
Figure 13D:
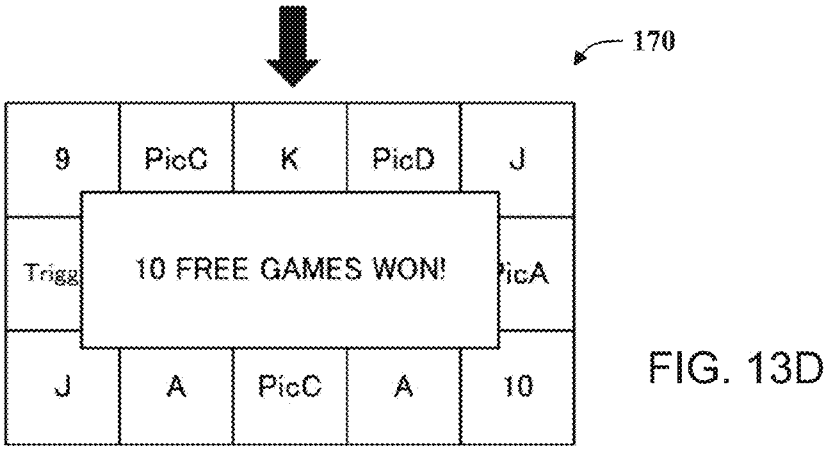

In the illustrated embodiment, in method step 214, the gaming controller 12 evaluates the outcome of the primary game 60 to determine if the second triggering condition 168 has occurred in the primary game outcome 96. In the illustrated embodiment, the second triggering condition 168 includes a predefined arrangement of special trigger symbols 114 appearing in the first triggering condition. For example, in one embodiment, the second triggering condition 168 is defined a plurality of special trigger symbols 114 being in displayed within adjacent symbol positions 112 and/or adjacent cells 104 along a payline 108. For example, in one embodiment, as shown in FIG. 13C, the second triggering condition 168 may include at least three identical special trigger symbols 114 appearing in adjacent symbol positions 112 within the 1$^{st}$ leftmost reel 172, the 2$^{nd}$ reel 174, and the 3$^{rd}$ reel 176. In another embodiment, the second triggering condition may include special trigger symbols 114 appearing in adjacent reels 106.

In method step 216, the gaming controller 12 determines a number of free games and/or free reel spins being awarded in the free game feature 88, and spins and stops the reels 106 to display each of the free spins. In method step 218, the gaming controller 12 also randomly selects an outcome of each free spins, spins and stops the reels to display each outcome, and determines an award associated with each free spin as a function of the symbols 98 being displayed with each corresponding outcome. In one embodiment, the gaming controller 12 may provide an award to the player after each free spins. In another embodiment, the gaming controller 12 may provide a total award equal to each corresponding free spins award at the conclusion of the final free spin. Upon the conclusion of the free game feature 88, the gaming controller 12 may proceed to method step 220 and/or displays the primary game.

In one embodiment, referring to FIGS. 16A-16D, the gaming controller 12 may detect each of the first and second triggering conditions 128 and 168 occurring in the primary game outcome 96 and display an image indicating the bonus award game feature 62 and the free game feature 88 being awarded to the player.

For example, referring to FIGS. 13A-13D in one embodiment, the gaming controller 12 initiates the primary game 60 and reels 1-5 start spinning. As reels 1-5 are stopped, the gaming controller 12 detects the trigger symbols in the 2$^{nd}$ row of reels 1, 2, and 3. These positions correspond three adjacent positions of Pay Line 1 from leftmost reel. Thus, free game triggering condition is satisfied. 10 free games awarded as a result of the triggering condition.

Referring to FIGS. 14A-14H, in one embodiment, the gaming controller 12 initiates the primary game 60 and reels 1-5 start spinning. As reels 1-5 are stopped, the gaming controller 12 detects 7 trigger symbols displayed in reels 1, 4 and 5. Thus, progressive game triggering condition is satisfied (scatter evaluation) and a Progressive chance is noticed to the player (shown in FIG. 14D). The gaming controller 12 randomly determines whether to provide the progressive game or not. In case of providing the progressive game, it is noticed to player. Otherwise, the game is return to initial state. Upon initiating the progressive game, the gaming controller 12 randomly determines a number of spins in the progressive game and displays the number of spins at the 1$^{st}$ trigger symbol (shown in FIG. 14F). The number of spins may be null, 1 or 2 with this embodiment. The gaming controller 12 then determines the number of spins for each trigger symbol and displays the number of spins at each trigger symbol one by one. After determining the number of spins corresponding to all trigger symbols, total number of spins is noticed to player (shown in FIG. 14H).

Referring to FIGS. 15A-15C, in one embodiment, the gaming controller 12 may randomly determine a credit prize or a number of spins in the progressive game for each trigger symbol and display its result at the corresponding trigger symbol. The result may be one of 100 credits, 200 credits, 300 credits, 1 spin and 2 spins with this embodiment. The results are determined and displayed at each trigger symbol one by one. After determining all results corresponding to each trigger symbols, the total number of spins and the total credit prize are noticed to player (shown in FIG. 15C).

Referring to FIGS. 17A-17L, the gaming controller 12 initiates the progressive game. The second display 58 is transformed to progressive game providing state. The total number of spins is displayed on the center indicator. The center indicator starts 1st spin (shown in FIG. 17B). The center indicator stops the 1$^{st}$ spin and points to one of the progressive prizes (shown in FIG. 17C). The pointed progressive prize is awarded to player. The total number of spins is decremented and the center indicator starts the 2$^{nd}$ spin. The center indicator stops the 2$^{nd}$ spin and points to one of the progressive prize. The pointed progressive prize is awarded to player. The total number of spins is decremented and the center indicator starts the 3$^{rd}$ spin (shown in FIG. 17F). The center indicator stops the 3$^{rd}$ spin and points to one of the progressive prize. The pointed progressive prize is awarded to player. The total number of spins is decremented and the center indicator starts the 4$^{th}$ spin (shown in FIG. 17H). The center indicator stops the 4$^{th}$ spin and points to one of the progressive prize. The pointed progressive prize is awarded to player. The total number of spins is decremented and the center indicator starts the 5$^{th}$ (last) spin. The center indicator stops the 5$^{th}$ spin and points to one of the progressive prize. The pointed progressive prize is awarded to player. After completing all the spins, the total amount of awarded progressive prize is displayed (shown in FIG. 17L). The progressive game is ended and the total amount is provided to player by the gaming controller 12.

Exemplary embodiments of a gaming device, a gaming system, and a method of providing an award to a player are described above in detail. The gaming device, system, and method are not limited to the specific embodiments described herein, but rather, components of the gaming device and/or system and/or steps of the method may be utilized independently and separately from other components and/or steps described herein. For example, the gaming device may also be used in combination with other gaming systems and methods, and is not limited to practice with only the gaming device as described herein. Rather, an exemplary embodiment can be implemented and utilized in connection with many other gaming system applications.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. That is, the database may include any structure of accessible collected data in this specification. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A gaming machine for providing a game to a player, comprising:
- a display device;
- a gaming controller coupled to the display device for executing the game, the gaming controller including a processor programmed to:
- display a primary game on the display device, the primary game including a plurality of reels being displayed in a grid, each of the reels including a plurality of symbols including a trigger symbol;
- randomly generate an outcome of the primary game and spin and stop the reels to display the outcome of the primary game;
- provide an award to the player as a function of the outcome of the primary game;
- detect a first triggering condition appearing in the outcome of the primary game including a plurality of trigger symbols being displayed in the grid with the reels stopped and responsively award a bonus award game upon detecting the first triggering condition;
- detect a second triggering condition appearing in the outcome of the primary game including the plurality of trigger symbols being displayed in a predefined arrangement and responsively award a free game feature upon detecting the second triggering condition; and
- initiate the bonus award game by:
- initiating a spin selection for each trigger symbol, each of the spin selections including randomly selecting a number of instances of the bonus award game associated with each corresponding trigger symbol;
- replacing each trigger symbol with a bonus symbol indicating the corresponding selected number of instances; and
- displaying the bonus award game on the display device including a plurality of award images indicating a plurality of bonus awards and an award selector image adapted to rotate on the display screen to indicate a selection of an award image.

2. The gaming machine in accordance with claim 1, the gaming controller configured to display the free game feature on the display device after displaying the bonus award game on the display device.

3. The gaming machine in accordance with claim 1, the second triggering condition being defined as the plurality of trigger symbols being displayed along a payline.

4. The gaming machine in accordance with claim 1, the gaming controller configured to determine a number of trigger symbols being displayed with the outcome of the primary game and determine a number of free reel spins included in the free game feature as a function of the determined number of trigger symbols.

5. The gaming machine in accordance with claim 1, the gaming controller configured to:
- determine a probability of initiating the bonus award feature as a function of the number of trigger symbols being displayed in the grid; and
- determine whether to initiate the bonus award game as a function of the determined probability.

6. The gaming machine in accordance with claim 1, the gaming controller configured to:
- randomly select at least one of the displayed trigger symbols; and
- randomly select a credit prize and replace the selected trigger symbol with an image of the selected credit prize.

7. The gaming machine in accordance with claim 1, the gaming controller configure to:
- determine a total number of instances of the bonus award game, and, for each instance of the bonus award game, randomly select a bonus award from a predefined set of bonus awards, each of the bonus awards having an associated award value.

8. The gaming machine in accordance with claim 7, the gaming controller configure to determine a total bonus award as a function of a value of each randomly selected bonus award and provide the total bonus award to the player.

9. The gaming machine in accordance with claim 1, the gaming controller configured to: for each instance of the bonus award game, spin and stop the award selector to indicate the corresponding selected bonus award.

10. A computer-implemented method of operating a gaming machine to display a game to a player, the gaming machine including a display device and a gaming controller including a processor, the method including the processor performing the steps of:

displaying a primary game on the display device including a plurality of reels being displayed in a grid, each of the reels including a plurality of symbols including a trigger symbol;

randomly generating an outcome of the primary game and spinning and stopping the reels to display the outcome of the primary game;

providing an award to the player as a function of the outcome of the primary game;

detecting a first triggering condition appearing in the outcome of the primary game including a plurality of trigger symbols being displayed in the grid with the reels stopped and responsively awarding a bonus award game upon detecting the first triggering condition;

detecting a second triggering condition appearing in the outcome of the primary game including the plurality of trigger symbols being displayed in a predefined arrangement and responsively awarding a free game feature upon detecting the second triggering condition; and initiating the bonus award game by:

initiating a spin selection for each trigger symbol, each of the spin selections including randomly selecting a number of instances of the bonus award game associated with each corresponding trigger symbol;

replacing each trigger symbol with a bonus symbol indicating the corresponding selected number of instances; and displaying the bonus award game on the display device including a plurality of award images indicating a plurality of bonus awards and an award selector image adapted to rotate on the display screen to indicate a selection of an award image.

11. The method in accordance with claim 10, including the step of displaying the free game feature on the display device after displaying the bonus award feature on the display device.

12. The method in accordance with claim 10, the second triggering condition being defined as the plurality of trigger symbols being displayed along a payline.

13. The method in accordance with claim 10, including the steps of determining a number of trigger symbols being displayed with the outcome of the primary game and determining a number of free reel spins included in the free game feature as a function of the determined number of trigger symbols.

14. The method in accordance with claim 10, including the steps of:

determining a probability of initiating the bonus award feature as a function of the number of trigger symbols being displayed in the grid; and determining whether to initiate the bonus award game as a function of the determined probability.

15. The method in accordance with claim 10, including the steps of:

randomly selecting at least one of the displayed trigger symbols; and randomly selecting a credit prize and replace the selected trigger symbol with an image of the selected credit prize.

16. The method in accordance with claim 10, including the steps of:

determining a total number of instances of the bonus award game, and, for each instance of the bonus award game, randomly selecting a bonus award from a predefined set of bonus awards, each of the bonus awards having an associated award value.

17. The method in accordance with claim 16, including the step of determining a total bonus award as a function of a value of each randomly selected bonus award and provide the total bonus award to the player.

18. The method in accordance with claim 10, including the steps of:

for each instance of the bonus award game, spinning and stopping the award selector to indicate the corresponding selected bonus award.

19. One or more non-transitory computer-readable storage media, having computer-executable instructions embodied thereon, wherein when executed by at least one processor, the computer-executable instructions cause the processor to:

display a primary game on a display device, the primary game including a plurality of reels and a plurality of symbols being displayed with the plurality of reels, plurality of symbols including a trigger symbol;

randomly generate an outcome of the primary game and spinning and stopping the reels to display the outcome of the primary game;

provide an award to the player as a function of the outcome of the primary game;

detect a first triggering condition appearing in the outcome of the primary game including a plurality of trigger symbols being displayed in the grid with the reels stopped and responsively award a bonus award game upon detecting the first triggering condition;

detect a second triggering condition appearing in the outcome of the primary game including the plurality of trigger symbols being displayed in a predefined arrangement and responsively award a free game feature upon detecting the second triggering condition; and initiate the bonus award game by:

initiating a spin selection for each trigger symbol, each of the spin selections including randomly selecting a number of instances of the bonus award game associated with each corresponding trigger symbol;

replacing each trigger symbol with a bonus symbol indicating the corresponding selected number of instances; and displaying the bonus award game on the display device including a plurality of award images indicating a plurality of bonus awards and an award selector image adapted to rotate on the display screen to indicate a selection of an award image.

20. The one or more non-transitory computer-readable storage media in accordance with claim 19, wherein the second triggering condition being defined as the plurality of trigger symbols being displayed along a payline.

* * * * *